(12) United States Patent
Hirata et al.

(10) Patent No.: US 12,088,956 B2
(45) Date of Patent: Sep. 10, 2024

(54) IMAGE PROCESSING APPARATUS, IMAGE PROCESSING METHOD, AND PROGRAM

(71) Applicant: Sony Group Corporation, Tokyo (JP)

(72) Inventors: Eiji Hirata, Kanagawa (JP); Shun Kaizu, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/014,399

(22) PCT Filed: Jul. 12, 2021

(86) PCT No.: PCT/JP2021/026091
§ 371 (c)(1),
(2) Date: Jan. 4, 2023

(87) PCT Pub. No.: WO2022/024730
PCT Pub. Date: Feb. 3, 2022

(65) Prior Publication Data
US 2023/0262193 A1 Aug. 17, 2023

(30) Foreign Application Priority Data

Jul. 29, 2020 (JP) .................................. 2020-128672

(51) Int. Cl.
*H04N 5/74* (2006.01)
*G06V 10/25* (2022.01)
(Continued)

(52) U.S. Cl.
CPC .............. *H04N 5/74* (2013.01); *G06V 10/25* (2022.01); *G06V 10/44* (2022.01); *H04N 9/31* (2013.01)

(58) Field of Classification Search
CPC ...... H04N 9/3185; H04N 9/3194; H04N 5/74; H04N 9/31; H04N 9/3147; H04N 9/3173;
(Continued)

(56) References Cited

U.S. PATENT DOCUMENTS

2011/0216284 A1* 9/2011 Chae .................... H04N 9/3147
353/30

FOREIGN PATENT DOCUMENTS

| JP | H02-305090 A | 12/1990 |
|---|---|---|
| JP | H06-209483 A | 7/1994 |

(Continued)

*Primary Examiner* — Sherrie Hsia
(74) *Attorney, Agent, or Firm* — Paratus Law Group, PLLC

(57) ABSTRACT

An image processing apparatus according to an embodiment of the present technology includes a first generator and a second generator. The first generator generates projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region. The second generator detects the feature-point image in a captured image obtained by capturing the projection image projected by each of the plurality of monochromatic projectors, and generates the correction parameter on the basis of a result of the detection of the feature-point image.

14 Claims, 14 Drawing Sheets

(51) Int. Cl.
*G06V 10/44* (2022.01)
*H04N 9/31* (2006.01)
(58) Field of Classification Search
CPC ........ G03B 21/00; G03B 21/14; G06V 10/25;
G06V 10/40; G06V 10/44; G06V 20/52;
G09G 5/377
USPC ..... 348/744–747, 750, 806, 807; 353/30, 48
See application file for complete search history.

(56) References Cited

FOREIGN PATENT DOCUMENTS

| | | |
|---|---|---|
| JP | H08-102956 A | 4/1996 |
| JP | H09-084034 A | 3/1997 |
| JP | 2004-334056 A | 11/2004 |
| JP | 2011-257609 A | 12/2011 |
| JP | 2019-215811 A | 12/2019 |

\* cited by examiner

FIG.3
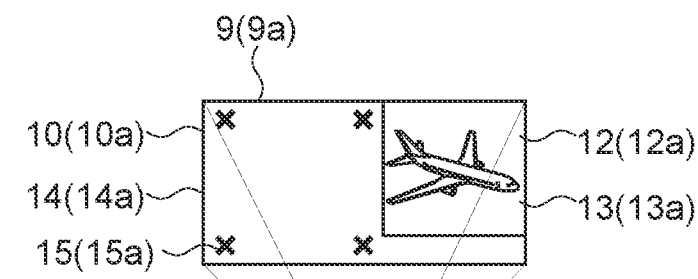
A
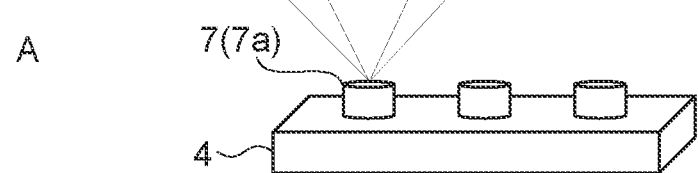
B
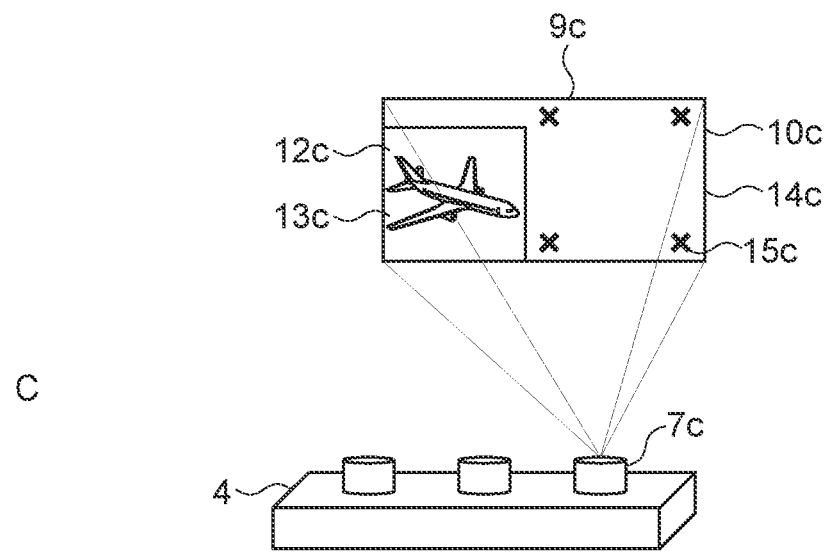
C

IMAGE PROCESSING APPARATUS, IMAGE PROCESSING METHOD, AND PROGRAM

CROSS REFERENCE TO PRIOR APPLICATION

This application is a National Stage Patent Application of PCT International Patent Application No. PCT/JP2021/026091 (filed on Jul. 12, 2021) under 35 U.S.C. § 371, which claims priority to Japanese Patent Application No. 2020-128672 (filed on Jul. 29, 2020), which are all hereby incorporated by reference in their entirety.

TECHNICAL FIELD

The present technology relates an image processing apparatus, an image processing method, and a program that can be applied to a projection of an image that is performed by a projector.

Background Art

Patent Literature 1 discloses a projection system that corrects for a shift caused between a projection-target object and a projection video due to the projection-target object being moved, in order to not cause the shift between the projection-target object and the projection video when the projection-target object is moved.

CITATION LIST

Patent Literature

Patent Literature 1: Japanese Patent Application Laid-open No. 2019-215811

DISCLOSURE OF INVENTION

Technical Problem

There is a need for a technology that makes it possible to project a high-quality image when an image is projected by a projector, as described above.

In view of the circumstances described above, it is an object of the present technology to provide an image processing apparatus, an image processing method, and a program that make it possible to project a high-quality image.

Solution to Problem

In order to achieve the object described above, an image processing apparatus according to an embodiment of the present technology includes a first generator and a second generator.

The first generator generates projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region.

The second generator detects the feature-point image in a captured image obtained by capturing the projection image projected by each of the plurality of monochromatic projectors, and generates the correction parameter on the basis of a result of the detection of the feature-point image.

In the image processing apparatus, a projection image is generated that includes a first pixel region that includes a content image, and a second pixel region that includes a feature-point image in at least a portion of the second pixel region. Further, the feature-point image is detected in a captured image obtained by capturing the projection image projected by each of the plurality of monochromatic projectors, and a correction parameter used to generate the projection image is generated on the basis of a result of the detection. This makes it possible to project a high-quality image using a plurality of monochromatic projectors.

The first generator may generate a plurality of the projection images such that the content images overlap each other when the plurality of the projection images is projected by the plurality of monochromatic projectors.

The image processing apparatus may further include an acquisition section that acquires the content image, which is to be projected by each of the plurality of monochromatic projectors. In this case, the first generator may correct the acquired content image using the correction parameter, and may generate the projection image.

The first generator may generate the projection image at a specified frame rate. In this case, the second generator may generate the correction parameter for each frame.

The second generator may update the correction parameter generated in a previous frame, on the basis of the result of the detection of the feature-point image.

The second generator may presume a change in the correction parameter on the basis of the result of the detection of the feature-point image, and may update the correction parameter.

The second generator may determine by which of the plurality of monochromatic projectors the feature-point image has been projected, and may generate the correction parameter correspondingly to each of the plurality of monochromatic projectors on the basis of the result of the detection of the feature-point image corresponding to the monochromatic projector of the plurality of monochromatic projectors.

The second generator may generate, as a dynamic correction parameter, at least one of the correction parameter related to a focal length of each of the plurality of monochromatic projectors, or the correction parameter related to a positional relationship between each of the plurality of monochromatic projectors and a projection plane. In this case, the first generator may generate the projection image using the generated dynamic correction parameter.

The image processing apparatus may further include a storage that stores therein, as a shared correction parameter, at least one of the correction parameter related to a relative positional relationship between the monochromatic projectors of the plurality of monochromatic projectors, or the correction parameter related to a lens distortion in each of the plurality of monochromatic projectors. In this case, the first generator may generate the projection image using the stored shared correction parameter.

The first generator may calculate a location of the feature-point image in the second pixel region on the basis of the generated correction parameter.

The first generator may generate, as a correction image, an image of which the entirety of a pixel region is a target for setting a feature-point image, the correction image being projected in a specified frame. In this case, the second generator may update the correction parameter on the basis of a captured image obtained by capturing the correction image projected by each of the plurality of monochromatic projectors.

The plurality of monochromatic projectors may be a first monochromatic projector, a second monochromatic projector, and a third monochromatic projector, the first monochromatic projector projecting a red image made up of red light, the second monochromatic projector projecting a green image made up of green light, the third monochromatic projector projecting a blue image made up of blue light. In this case, a color image may be displayed by the content images overlapping each other when the plurality of the projection images is projected by the plurality of monochromatic projectors.

An image processing method according to an embodiment of the present technology is an image processing method that is performed by a computer system, the image processing method including generating projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region.

The feature-point image is detected in a captured image obtained by capturing the projection image projected by each of the plurality of monochromatic projectors, and the correction parameter is generated on the basis of a result of the detection of the feature-point image.

A program according to an embodiment of the present technology causes a computer system to perform a process including:

generating projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region;

detecting the feature-point image in a captured image obtained by capturing the projection image projected by each of the plurality of monochromatic projectors; and generating the correction parameter on the basis of a result of the detection of the feature-point image.

BRIEF DESCRIPTION OF DRAWINGS

FIG. 3 schematically illustrates projections of monochromatic images that are respectively performed by first to third monochromatic projectors.

MODE(S) FOR CARRYING OUT THE INVENTION

Embodiments according to the present technology will now be described below with reference to the drawings.

Example of Application of Image Projection System

Figure 1:
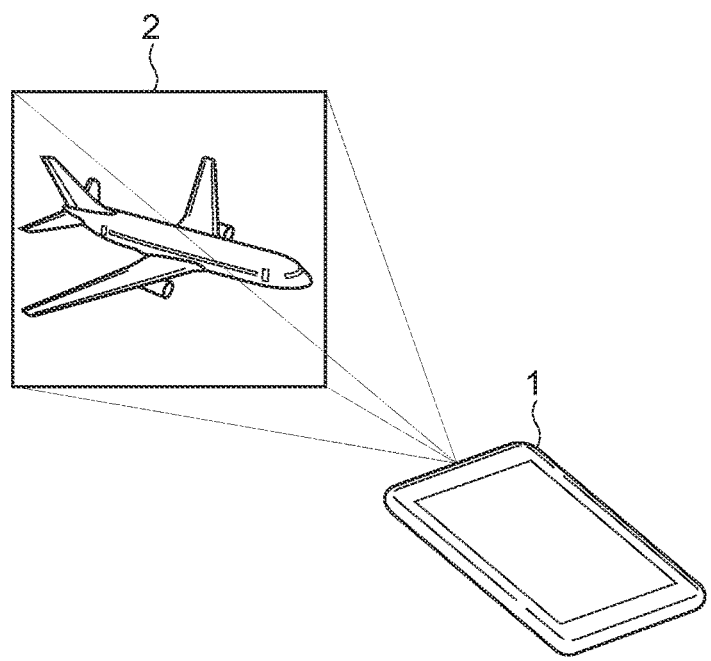
FIG. 1 is a schematic diagram used to describe an example of the application of an image projection system according to the present technology.

FIG. 1 is a schematic diagram used to describe an example of the application of an image projection system according to the present technology.

As illustrated in FIG. 1, the image projection system according to the present technology can be applied to a projection of a color image 2 that is performed by a mobile terminal 1 such as a smartphone or a tablet terminal.

Of course, the present technology is not limited to being applied to the mobile terminal 1. The present technology can be applied to any electronic apparatuses such as (glasses-type or wristband-type) wearable information apparatuses and game devices.

[Image Projection System]

Figure 2:
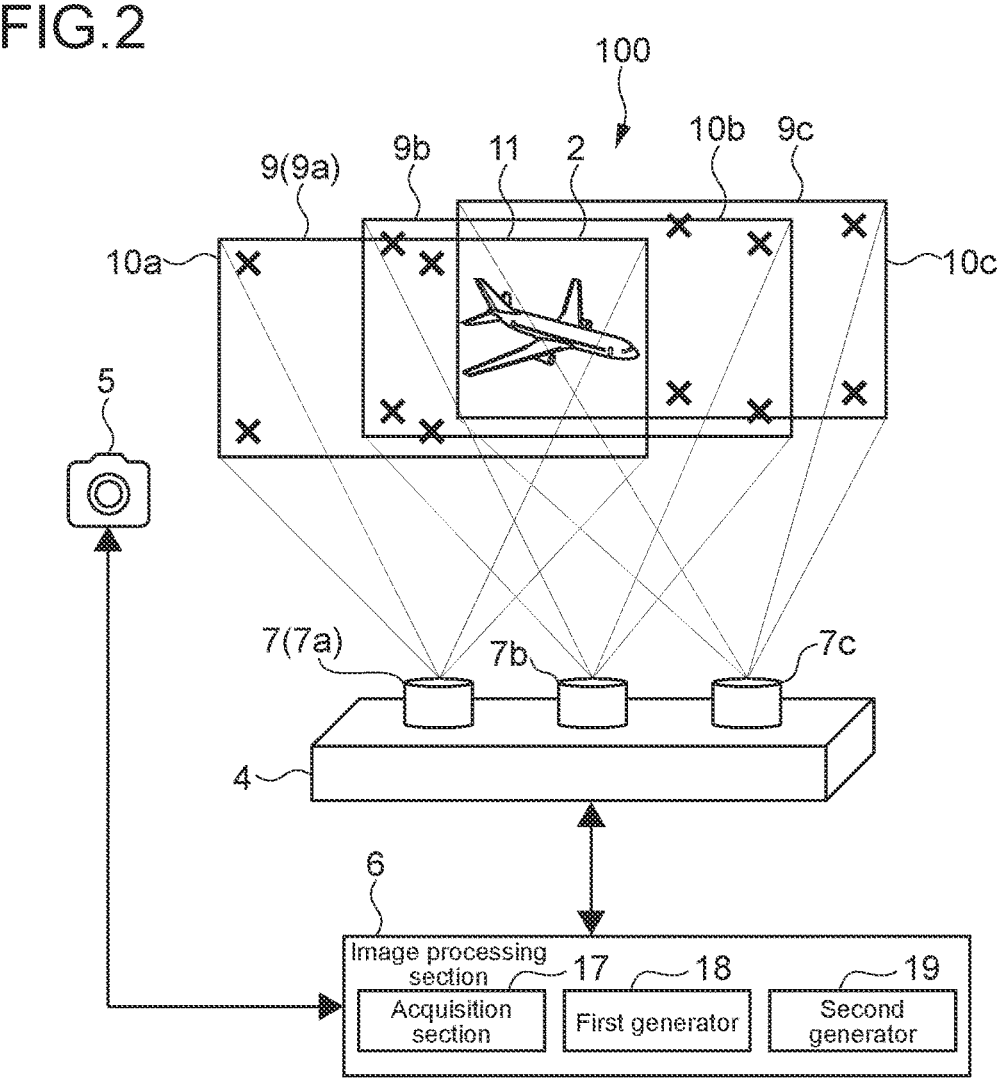
FIG. 2 schematically illustrates an example of a configuration of an image projection system according to an embodiment of the present technology.

FIG. 2 schematically illustrates an example of a configuration of an image projection system according to an embodiment of the present technology.

An image projection system 100 includes an image projection apparatus 4, an image-capturing apparatus 5, and an image processing section 6. The image projection apparatus 4 and the image processing section 6 are electrically connected to each other. Further, the image-capturing apparatus 5 and the image processing section 6 are also electrically connected to each other.

The image projection system 100 is included in, for example, the mobile terminal 1 illustrated in FIG. 1.

As illustrated in FIG. 2, the image projection apparatus 4 includes a plurality of monochromatic projectors 7.

The monochromatic projector 7 can generate a monochromatic image 9 made up of monochromatic light to project the generated monochromatic image 9.

For example, the monochromatic projector 7 includes an organic light-emitting diode (OLED) panel that can self-luminesces to generate the monochromatic image 9, and a projection lens section that projects generated image light onto a projection plane (neither of them is illustrated).

Alternatively, the monochromatic projector 7 may include a light source section that emits monochromatic light, a light modulator that modulates the monochromatic light emitted by the light source section to generate image image light, and a projection lens section that projects, onto a projection plane, the image light generated by the light modulator (none of them are illustrated).

A solid-state light source such as a light-emitting diode (LED) or a laser diode (LD), a mercury lamp, a xenon lamp, or the like is arranged as the light source section.

For example, any device such as a liquid crystal panel or a digital micromirror device (DMD) may be used as the light modulator.

The projection lens section includes, for example, a plurality of projection lenses, and a specific configuration of the projection lens section may be designed as appropriate.

Moreover, a specific configuration of the monochromatic projector 7 is not limited, and any configuration may be adopted.

In the present embodiment, first to third monochromatic projectors 7a to 7c are used as the plurality of monochromatic projectors 7. Each of the first to third monochromatic projectors 7a to 7c is configured to be capable of projecting the monochromatic image 9. Note that, in the present disclosure, examples of an image include both a still image and a moving image (a video).

The first monochromatic projector 7a projects a red image 9a made up of red light.

The second monochromatic projector 7b projects a green image 9b made up of green light.

The third monochromatic projector 7c projects a blue image 9c made up of blue light.

The relative positional relationship between the first to third monochromatic projectors 7a to 7c is defined, and the first to third monochromatic projectors 7a to 7c are arranged according to the defined relationship. In the present embodiment, the first to third monochromatic projectors 7a to 7c are arranged side by side in parallel with a direction. Further, the first to third monochromatic projectors 7a to 7c are arranged such that the first to third monochromatic projectors 7a to 7c project respective pieces of image light in the same direction.

As illustrated in FIG. 2, the first to third monochromatic projectors 7a to 7c are arranged such that projection ranges 10 (10a to 10c) onto which the monochromatic images 9a to 9c of colors of R, G, and B can be respectively projected are different from each other. Further, the first to third monochromatic projectors 7a to 7c are arranged such that portions of the respective projection ranges 10 (10a to 10c) overlap each other.

In other words, a portion of the red image 9a projected by the first monochromatic projector 7a, a portion of the green image 9b projected by the second monochromatic projector 7b, and a portion of the blue image 9c projected by the third monochromatic projector 7c are projected to overlap each other.

Thus, when the red image 9a, the green image 9b, and the blue image 9c are respectively projected by the first to third monochromatic projectors 7a to 7c, the color image 2 can be projected onto an overlap range 11 in which the three monochromatic images 9a to 9c overlap.

In other words, the present embodiment makes it possible to project the color image 2 by blending the monochromatic images 9a to 9c of the three primary colors of R, G, and B. The blending of images can also be said to be image combining.

The overlap range 11 onto which the color image 2 is projected is hereinafter referred to as a projectable range 11 onto which the color image 2 can be projected, using the same reference numeral.

Note that, in the present embodiment, the red image 9a, the green image 9b, and the blue image 9c correspond to a plurality of projection images.

FIG. 3 schematically illustrates projections of the monochromatic images 9 that are respectively performed by the first to third monochromatic projectors 7a to 7c.

Each of the first to third monochromatic projectors 7a to 7c includes a first projection region 13 onto which a content image 12 is projected, and a second projection region 14 that is a region other than the first projection region 13.

The content image 12 is an image that is to be viewed by a viewer, and the type of content image 12 is not limited.

The first projection region 13 can also be referred to as a content projection region. Further, the second projection region 14 can also be referred to as a non-content-projection region.

As illustrated in FIG. 3, a feature-point image 15 is projected onto at least a portion of the second projection region 14.

As illustrated in A of FIG. 3, the red image 9a is projected by the first monochromatic projector 7a. The red image 9a includes a first projection region 13a onto which a content image 12a is projected, and a second projection region 14a onto which the content image 12a is not projected.

Note that a peripheral edge of the second projection region 14a is indicated by a line in FIG. 3. On the other hand, it is also possible to only project the feature-point image 15 onto the second projection region 14a. In this case, the peripheral edge (the line) of the second projection region 14a illustrated in FIG. 3 is not projected. The same applies to the green image 9b and the blue image 9c being respectively illustrated in B and C of FIG. 3.

In the example illustrated in A of FIG. 3, a right region in the entirety of the red image 9a, that is, in the projection range 10a of the red image 9a corresponds to the first projection region 13a, and the content image 12a is projected onto the right region.

As illustrated in B of FIG. 3, the green image 9b is projected by the second monochromatic projector 7b. The green image 9b includes a first projection region 13b onto which a content image 12b is projected, and a second projection region 14b onto which the content image 12b is not projected.

In the example illustrated in B of FIG. 3, a middle region in the entirety of the green image 9b, that is, in the projection range 10b of the green image 9b corresponds to the first projection region 13b, and the content image 12b is projected onto the middle region.

As illustrated in C of FIG. 3, the blue image 9c is projected by the third monochromatic projector 7c. The blue image 9c includes a first projection region 13c onto which a content image 12c is projected, and a second projection region 14c onto which the content image 12c is not projected.

In the example illustrated in C of FIG. 3, a left region in the entirety of the blue image 9c, that is, in the projection range 10c of the blue image 9c corresponds to the first projection region 13c, and the content image 12c is projected onto the left region.

Note that the image projection apparatus 4 including the first to third monochromatic projectors 7a to 7c serves as a projector that can project the color image 2.

The image-capturing apparatus 5 is arranged to be capable of capturing the red image 9a, the blue image 9b, and the green image 9c respectively projected onto a projection plane by the first to third monochromatic projectors 7a to 7c.

For example, a digital camera that includes an image sensor such as a complementary-metal-oxide semiconductor (CMOS) sensor or a charge coupled device (CCD) sensor is used as the image-capturing apparatus 5. Moreover, any image-capturing apparatus may be used as the image-capturing apparatus 5.

In the present embodiment, a color camera (an RGB camera) is used as the image-capturing apparatus 5. Thus, the colors of R, G, and B are reproduced when the red image 9a, the blue image 9b, and the green image 9c are captured by the image-capturing apparatus 5. A specific configuration of the RGB camera is not limited.

The image processing section 6 includes hardware, such as a processor such as a CPU, a GPU, and a DSP; a memory such as a ROM and a RAM; and a storage device such as an HDD, that is necessary for a configuration of a computer. For example, an image processing method according to the present technology is performed by, for example, the processor loading, into the RAM, a program according to the present technology that is recorded in, for example, the memory or the storage device in advance and executing the program.

A configuration of the image processing section 6 is not limited, and any hardware and any software may be used. Of course, hardware such as an FPGA or an ASIC may be used. Further, a location at which the image processing section 6 is implemented is also not limited, and designing may be performed discretionarily.

In the present embodiment, an acquisition section 17, a first generator 18, and a second generator 19 are implemented as functional blocks by the processor executing a specified program, as illustrated in FIG. 2. Of course, dedicated hardware such as an integrated circuit (IC) may be used in order to implement the functional blocks.

The program is installed through, for example, various recording media. Alternatively, the installation of the program may be performed via, for example, the Internet.

The type and the like of a recording medium that records therein a program are not limited, and any computer-readable recording medium may be used. For example, any non-transitory computer-readable recording medium may be used.

The acquisition section 17 acquires content images (pieces of image data) that are to be respectively projected by a plurality of monochromatic projectors 7. In the present embodiment, content images (pieces of image data) that are to be respectively projected by the first to third monochromatic projectors 7a to 7c are acquired.

Note that, in the present disclosure, the acquiring an image includes both receiving, by the acquisition section 17, image data from an external apparatus and generating image data by the acquisition section 17.

Figure 4:
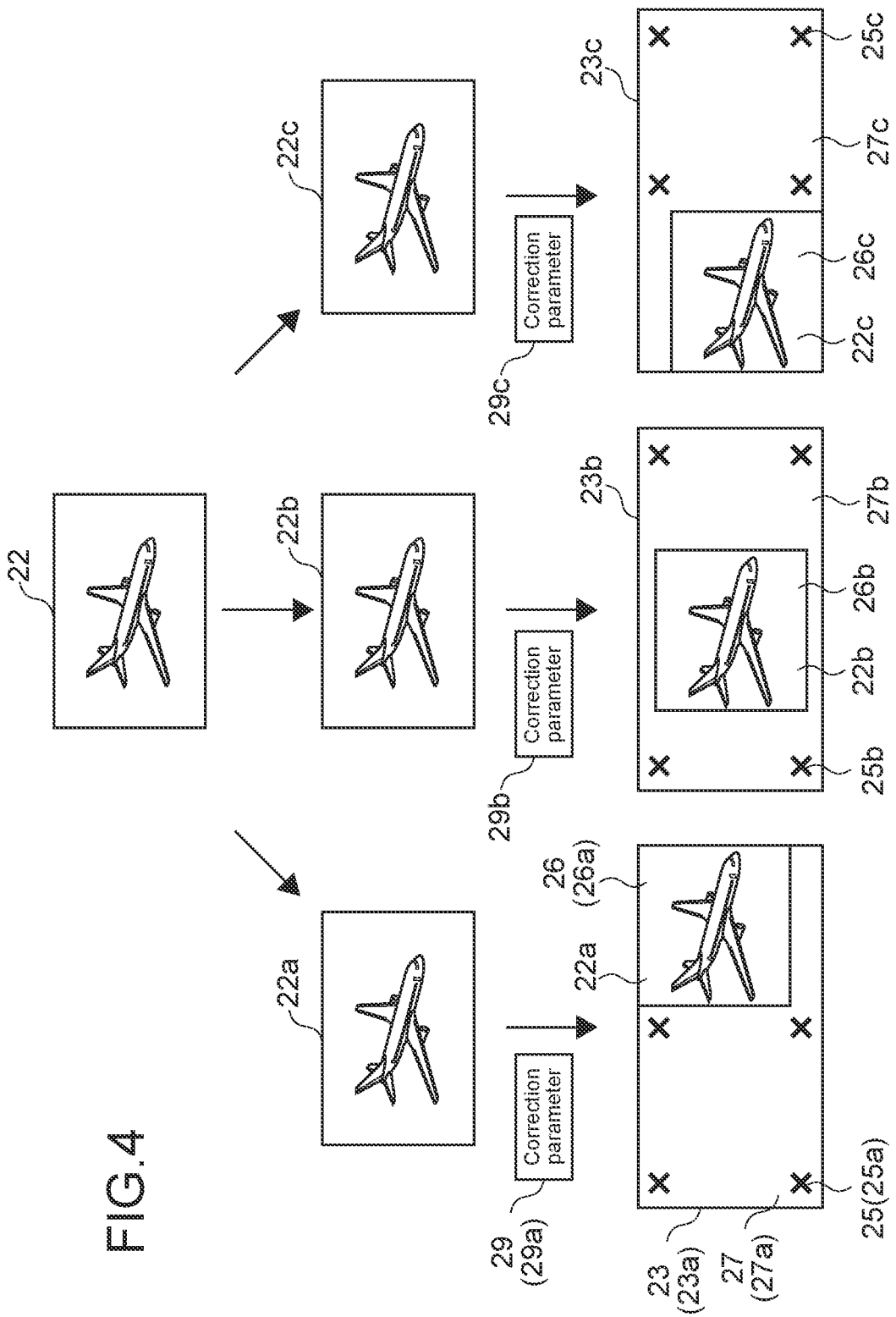
FIG. 4 schematically illustrates an example of generating a projection image.

Correspondingly to the respective monochromatic projectors 7 of a plurality of monochromatic projectors 7, the first generator 18 generates projection images (pieces of image data) used to project images. In the present embodiment, projection images (pieces of image data) used to project the monochromatic images 9a to 9c of the colors of R, G, and B illustrated in FIG. 4, are generated. The second generator 19 generates a correction parameter used by the first generator 18 to generate a projection image. Thus, the first generator 18 generates a projection image using a correction parameter generated by the second generator 19.

In the present embodiment, the mobile terminal 1 including the image processing section 6 corresponds to an embodiment of an image processing apparatus according to the present technology.

Figure 5:
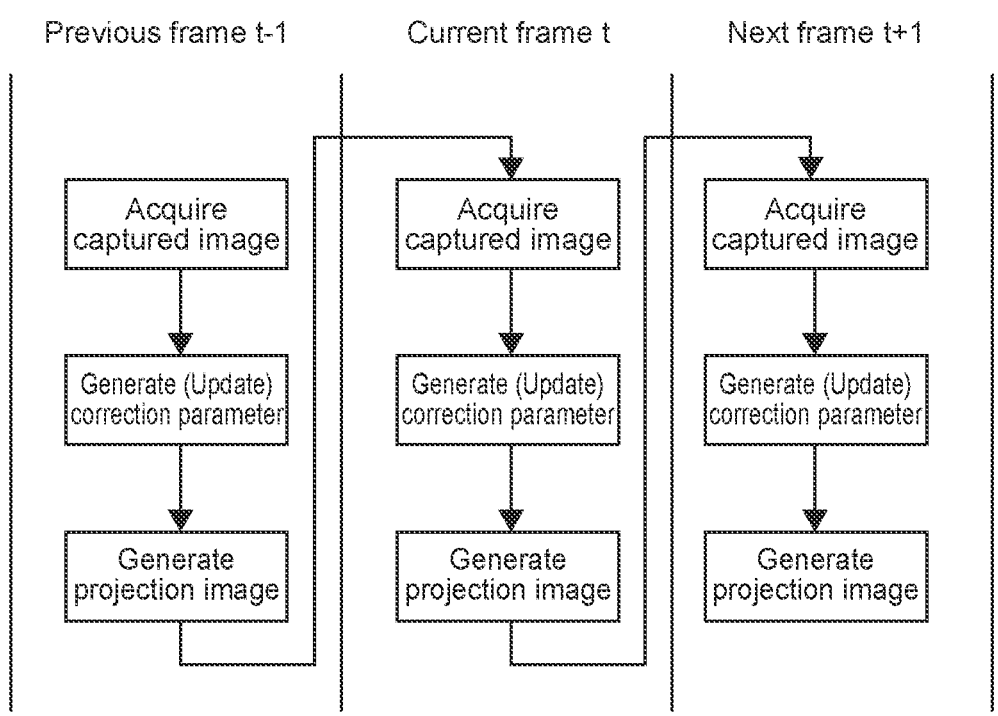
FIG. 5 schematically illustrates the example of generating a projection image.

FIGS. 4 and 5 are schematic diagrams used to describe an example of an operation of the image processing section 6.

For example, from, for example, an external image supplying apparatus, the acquisition section 17 acquires a content image 22 (image data) that is a color image, as illustrated in FIG. 4.

The acquisition section 17 decomposes the color content image 22 into pieces of image data of the three primary colors of R, G, and B. Consequently, a content image 22a that is to be projected by the first monochromatic projector 7a is acquired. Further, a content image 22b that is to be projected by the second monochromatic projector 7b is acquired. Furthermore, a content image 22c that is to be projected by the third monochromatic projector 7c is acquired.

Of course, the content images 22a and 22b obtained by the decomposition into the three primary colors of R, G, and B may be acquired from, for example, the external image supplying apparatus.

The first generator 18 generates projection images 23 (23a to 23c) correspondingly to the first to third monochromatic projectors 7a to 7c.

As illustrated in FIG. 4, the projection image 23 includes a first pixel region 26 (26a to 26c) that includes the content image 22 (22a to 22c), and a second pixel region 27 (27a to 27c) that is a region other than the first pixel region 26. The second pixel region 27 includes a feature-point image 25 (25a to 25c) in at least a portion of the second pixel region 27.

The content image 22 corresponds to the content image 12 in a projection plane. Further, the first pixel region 26 corresponds to the first projection region 13 in the projection plane. Furthermore, the second pixel region 27 corresponds to the second projection region 14 in the projection plane.

The first generator 18 generates the projection images 23 (23a to 23c) such that the content images 12a to 12c overlap each other when the plurality of monochromatic images 9a to 9c is projected by the first to third monochromatic projectors 7a to 7c, as illustrated in FIG. 2.

Note that the plurality of monochromatic images 9 respectively projected by the first to third monochromatic projectors 7a to 7c corresponds to a plurality of projection images projected on the basis of the generated projection images 23 (pieces of image data).

The first generator 18 generates the projection images 23a to 23c such that the content images 12a to 12c overlap in a projection plane with a high degree of accuracy. For this purpose, the first generator 18 generates the projection images 23a to 23c using correction parameters 29 (29a to 29c), as illustrated in FIG. 4.

Specifically, using the correction parameters 29a to 29c, the first generator 18 corrects the content images 22a and 22b acquired by the acquisition section 17, and generates the projection images 23a to 23c.

Examples of the correction using a correction parameter include geometric transformation such as distorting a content image according to a geometric positional relationship of a projection plane.

As an example of correcting the content image 22 using a correction parameter, geometric transformation (coordinate transformation) on an image as represented by a formula indicated below is performed.

$$\begin{pmatrix} X' \\ Y' \\ 1 \end{pmatrix} = \begin{pmatrix} Mc \end{pmatrix} \begin{pmatrix} X \\ Y \\ 1 \end{pmatrix} \quad \text{[Math. 1]}$$

In the formula of [Math. 1], a coordinate value (X,Y) is a coordinate value of each pixel in the content image 22. The coordinate value of each pixel in the content image 22 is transformed using a transformation matrix Mc. Then, a pixel value of the pixel of the coordinate value (X,Y) in the content image 22 is assigned to a pixel in the projection image 23 that corresponds to a coordinate value (X',Y') obtained by the transformation.

Examples of the geometric transformation on an image include linear transformation such as enlargement/reduction, translation, and rotation. Without being limited thereto, any geometric transformation using, for example, projective transformation, affine transformation, or nonlinear transformation may be performed.

Further, when the transformation matrix Mc is used, the transformation matrix Mc serves as the correction parameter 29. Furthermore, an element (a component) of the transformation matrix Mc is also included in the correction parameter 29.

Of course, generation of the projection image 23 that is performed by the first generator 18 using the correction parameter 29 is not limited to geometric transformation on the content image 22. Any other image generation methods may be used.

Further, a parameter that is different from the transformation matrix Mc may be used as an embodiment of the correction parameter according to the present technology.

A pixel region that includes the content image 22 corrected by the first generator 18 is the first pixel region 26. The feature-point image 25 is set in at least a portion of the second pixel region 27 that is a region other than the first pixel region 26.

For example, in image data generation, a region that corresponds to a valid pixel region in a panel is defined as a rendering region. Further, the pixel value is set to be a value for performing rendering to generate an image in the rendering region.

In this case, the first generator 18 performs rendering to generate the corrected content image 22 in a portion of the pixel region, and performs rendering to generate the feature-point image 25 in a non-content-image rendering region in which rendering to generate the content image 22 is not performed. Such a description is also possible.

An image having any shape can be used as the feature-point image 25. Examples of the feature-point image 25 include a cross (a cross mark), a triangular mark, a rectangular mark, and a circular mark. Any image from which how each monochromatic image 9 is projected onto a projection plane by a corresponding one of the monochromatic projectors 7 can be detected, may be used as the feature-point image 25.

In the present embodiment, rendering is performed to generate the feature-point image 25 at a location close to each of the four corners of the projection image 23, or at a location close to the first pixel region 26 including the content image 22, as illustrated in FIG. 4. The number of feature-point images 25, a location at which the feature-point image is formed, and the like are not limited, and may be set discretionarily.

If the feature-point image 25 is situated too close to the content image 22 (the first pixel region 26), the feature-point image 25 of a certain color may overlap the content image 12 (the first projection region 13) of the monochromatic image 9 of another color due to, for example, a slight shift upon projecting the monochromatic images 9a to 9c of the three primary colors of R, G, and B. Further, there is a possibility of preventing the content image 12 from being viewed.

On the other hand, if the feature-point image 25 is set only at a location situated away from the content image 22 (the first pixel region 26), there may be a reduction in the accuracy in detecting a projection state near the projected content image 12.

Thus, the feature-point image 25 is set at some distance from the content image 22 (the first pixel region 26), and this makes it possible to accurately detect the projection state near the projected content image 12. In addition, the feature-point image 25 is set at a location close to each of the four corners of the projection image 23, and this makes it possible to accurately detect a projection state of the entirety of the projection image 23.

The second generator 19 detects the feature-point images 15 in captured images obtained by capturing the monochromatic images 9a to 9c respectively projected by the first to third monochromatic projectors 7a to 7c, and generates the correction parameters 29a to 29c used to generate the projection images 23a to 23c, on the basis of a result of the detection of the feature-point images 15.

For example, a location of the feature-point image is detected in the captured image, and the correction parameter 29 is generated on the basis of the detected location of the feature-point image 15. Moreover, a shape or the like of the feature-point image 15 may be used as the result of the detection of the feature-point image 15.

The second generator 19 is configured to be capable of determining by which of the first to third monochromatic projectors 7a to 7c the feature-point image 15 has been projected.

In the present embodiment, an RGB camera is used as the image-capturing apparatus 5. Thus, it is possible to determine, on the basis of information regarding the RGB color, by which of the monochromatic projectors 7 the feature-point image 15 has been projected.

Of course, any other method may be used as the method for determining by which of the monochromatic projectors 7 the feature-point image 15 has been projected. For example, which of the monochromatic projectors 7 has projected the feature-point image 25 can be determined by changing the shape of the projected feature-point image 15 according to each monochromatic projector 7.

The second generator 19 generates the correction parameters 29a to 29c correspondingly to the first to third monochromatic projectors 7a to 7c on the basis of a result of detection of the feature-point images 15 respectively corresponding to the first to third monochromatic projectors 7a to 7c.

Examples of the correction parameter 29 include the correction parameters 29 respectively used to correct four components that are a component resulting from a lens distortion in the monochromatic projector 7, a component resulting from a geometric positional relationship between the monochromatic projectors 7, a component resulting from a focal length (a lens focus) of the monochromatic projector 7, and a component resulting from a geometric positional relationship between hardware and a projection plane.

In other words, examples of the correction parameter 29 include the following correction parameters.

A correction parameter related to a relative positional relationship between the first to third monochromatic projectors 7a to 7c.

A correction parameter related to a lens distortion in each of the first to third monochromatic projectors 7a to 7c.

A correction parameter related to a focal length of each of the first to third monochromatic projectors 7a to 7c.

A correction parameter related to a relative positional relationship between each of the first to third monochromatic projectors 7a to 7c and a projection plane.

Of course without being limited to these correction parameters 29, any correction parameter that can be used to generate the projection image 23 may be generated. Further, it is sufficient if at least one of the various correction parameters 29 described above is generated.

FIG. 5 schematically illustrates an example of generating the projection image 23.

For example, the first generator 18 generates the projection images 23a to 23c at a specified frame rate, as illustrated in FIG. 5. A specific value of the frame rate is not limited.

In the present embodiment, the image-capturing apparatus 5 captures, for each frame, the monochromatic images 9a to 9c respectively projected by the first to third monochromatic projectors 7a to 7c.

Further, the second generator 19 acquires captured images for each frame, and generates the correction parameters 29a to 29c on the basis of a result of detection of the feature-point images 15. Note that the generating the correction parameter 29 includes updating the correction parameter 29 generated in a previous frame.

Thus, the second generator 19 may update the correction parameters 29a to 29c generated in a previous frame, on the basis of a result of detection of the feature-point images 15. Further, the second generator 19 may presume amounts of changes in the correction parameters 29a to 29c on the basis of a result of detection of the feature-point images 15, and may update the correction parameters 29a to 29c.

For example, a change in a focal length of each of the first to third monochromatic projectors 7a is presumed on the basis of a location of the feature-point image 15. A change in the correction parameter 29 related to a focal length is presumed on the basis of a result of the presumption to update the correction parameter 29.

Further, a change in a relative positional relationship between each of the first to third monochromatic projectors 7a to 7c and a projection plane is presumed on the basis of a location of the feature-point image 15. A change in the correction parameter 29 related to a relative positional relationship is presumed on the basis of a result of the presumption to update the correction parameter 29. Such processing is also possible.

The first generator 18 generates the projection images 23a to 23c using the correction parameters 29 generated by the second generator 19.

For example, the monochromatic images 9a to 9c of the three primary colors of R, G, and B are projected by the first to third monochromatic projectors 7a and 7b in a previous frame (t−1) on the basis of the projection images 23a to 23c, as illustrated in FIG. 5.

The correction parameters 29a to 29c are generated in a current frame on the basis of the captured images obtained by capturing the projected monochromatic images 9a and 9b. Then, the projection images 23a to 23c in the current frame are generated using the correction parameters 29a to 29c.

As described above, the correction parameters 29a to 29c are generated for each frame on the basis of a result of detection of the feature-point images 15. Then, the projection images 23a to 23c are generated using the correction parameters 29a to 29c.

This makes it possible to cause the content images 12a to 12c to overlap in a projection plane with a high degree of accuracy, and thus to project a high-quality color image 2.

The embodiment of the image projection system 100 according to the present technology 100 is described in more detail.

Figure 6:
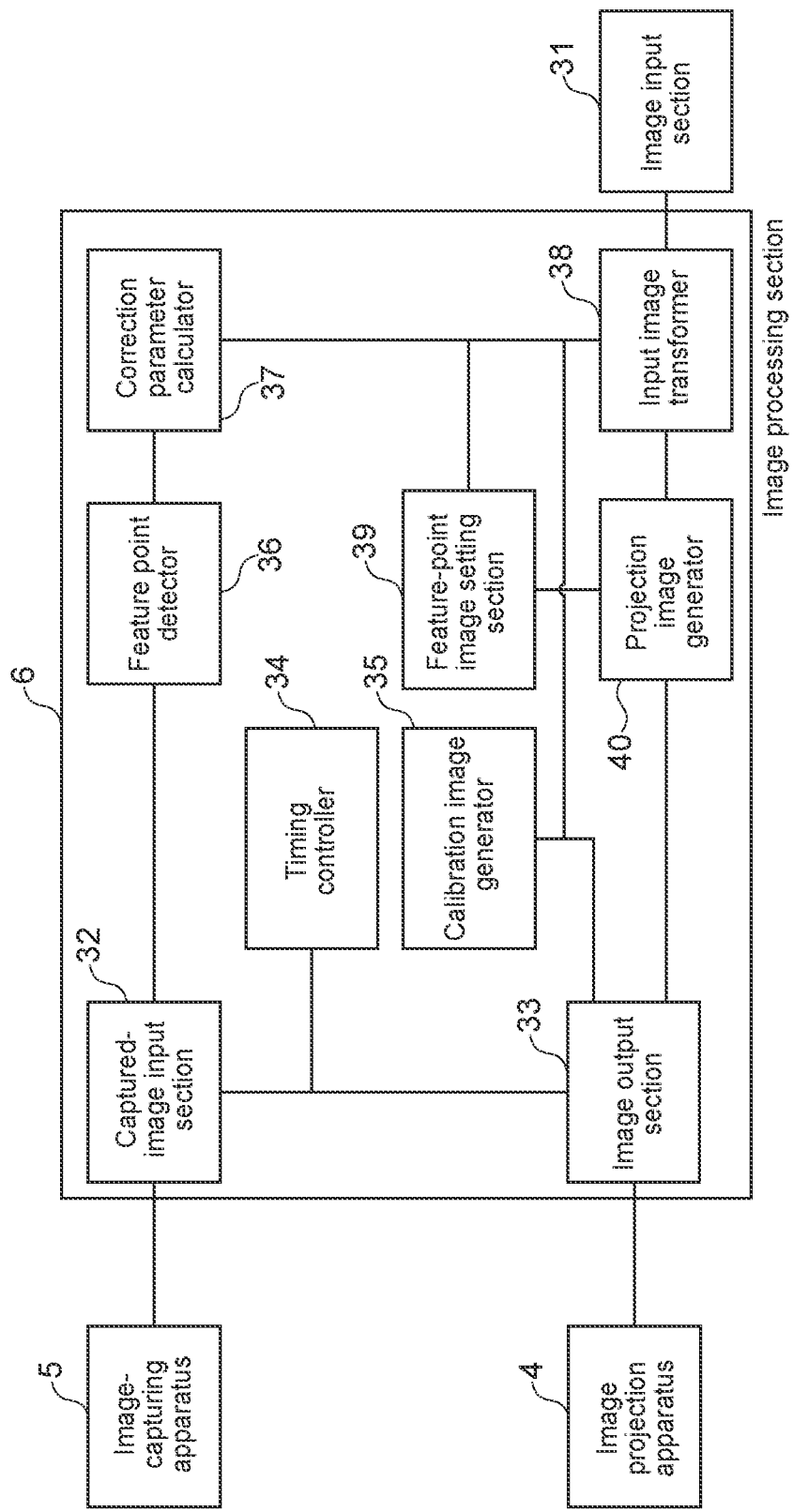
FIG. 6 is a block diagram illustrating an example of a functional configuration of the image projection system.

FIG. 6 is a block diagram illustrating an example of a functional configuration of the image projection system 100. With respect to the image projection apparatus 4 and the image-capturing apparatus 5, the image projection apparatus 4 and image-capturing apparatus 5 described with reference to, for example, FIG. 2 are used.

An image input section 31 is a block that inputs the content image 22 into the mobile terminal 1 through any video-related interface such as HDMI (registered trademark) or a USB.

In the present embodiment, the image processing section 6 includes a captured-image input section 32, an image output section 33, a timing controller 34, a calibration image generator 35, a feature point detector 36, a correction parameter calculator 37, an input image transformer 38, a feature-point image setting section 39, and a projection image generator 40.

These blocks are implemented by, for example, a processor executing a specified program. Of course, dedicated hardware such as an integrated circuit (IC) may be used in order to implement the functional blocks.

An image captured by the image-capturing apparatus 5 is input to the captured-image input section 32.

The image output section 33 outputs, to the image projection apparatus 4, pieces of image data that are to be respectively projected by a plurality of monochromatic projectors 7.

The timing controller 34 outputs, in each frame, a timing signal used to synchronize operations of the respective blocks from captured images being input to pieces of image data being output.

The calibration image generator 35 generates a calibration image.

The feature point detector 36 detects the feature-point image 15 in a captured image.

The correction parameter calculator 37 generates the correction parameter 29 on the basis of a result of the detection of the feature-point image 15. In the present embodiment, calculation is performed on the basis of the result of the detection of the feature-point image 15 for each frame, and the correction parameter 29 is updated.

The input image transformer 38 performs geometric transformation on the input image using the correction parameter. For example, geometric transformation is performed on the input content image 22 or an input calibration image.

The feature-point image setting section 39 sets, for example, a location and a shape of the feature-point image 25.

The projection image generator 40 generates the projection image 23 including the content image 22 on which geometric transformation has been performed, and the set feature-point image 25. In other words, rendering is performed by the projection image generator 40 to generate the content image 22 on which geometric transformation has been performed, and the set feature-point image.

In the example illustrated in FIG. 6, the acquisition section 17 illustrated in FIG. 2 is implemented by the input image transformer 38.

The first generator 18 illustrated in FIG. 2 is implemented by the input image transformer 38, the feature-point image setting section 39, and the projection image generator 40.

The second generator 19 illustrated in FIG. 2 is implemented by the captured-image input section 32, the feature point detector 36, and the correction parameter calculator 37.

In the present embodiment, the correction parameters 29 used to generate the projection image 23 are classified into a shared correction parameter and a dynamic correction parameter.

The shared correction parameter is stored in a memory or a storage device (corresponding to an embodiment of a storage) that is included in the image processing section 6. Further, the shared correction parameter is read from the storage for each frame, and is used to generate the projection image 23.

The dynamic correction parameter is generated for each frame on the basis of a result of detection of the feature-point image 15, and is used to generate the projection image 23.

For example, it is assumed that a transformation matrix Mc1 is used as the shared correction parameter, and a transformation matrix Mcg is used as the dynamic correction parameter. In this case, for example, geometric transformation on an image as represented by a formula indicated below is performed.

$$\begin{pmatrix} X' \\ Y' \\ 1 \end{pmatrix} = \begin{pmatrix} Mc2 \end{pmatrix} \begin{pmatrix} Mc1 \end{pmatrix} \begin{pmatrix} X \\ Y \\ 1 \end{pmatrix} \quad \text{[Math. 2]}$$

The transformation matrix Mc1 is read from the storage for each frame. The transformation matrix Mc2 is generated in real time for each frame. For example, each component of the transformation matrix Mc2 is updated as appropriate.

For example, a correction parameter such as a hardware-specific correction parameter that is rarely changed every moment once obtained, is selected as the shared correction parameter.

For example, it is often the case that there is a need for a complicated correction with respect to a component resulting from a lens distortion in the monochromatic projector 7, and a component resulting from a geometric positional relationship between the monochromatic projectors 7. On the other hand, these components are less likely to be greatly changed upon projecting an image according to, for example, the use environment.

Thus, for example, a correction parameter related to a relative positional relationship between the first to third monochromatic projectors 7a to 7c, and a correction parameter related to a lens distortion in each of the first to third monochromatic projectors 7a to 7c are selected as the shared correction parameters.

For example, a correction parameter that is greatly changed according to the environment of the use of hardware is selected as the dynamic correction parameter. Further, a correction parameter used to correct a component, such as a component resulting from a focal length of the monochromatic projector 7 or a component resulting from a geometric positional relationship between hardware and a projection plane, that can be relatively easily corrected in real time is selected.

For example, a correction parameter related to a focal length of each of the first to third monochromatic projectors 7a to 7c, and a correction parameter related to a positional relationship between each of the first to third monochromatic projectors 7a to 7c and a projection plane are selected as the dynamic correction parameters.

For example, scaling (zoom) of the content image 12 projected onto a projection plane is changed according to a change in a focal length of each of the first to third monochromatic projectors 7a to 7c. Thus, the correction parameter 29 being capable of correcting a change in scaling of the projected content image 12 is generated as the dynamic correction parameter. For example, the transformation matrix Mcg enlarging or reducing the input content image 12 is used as the correction parameter 29 being capable of correcting a change in scaling. The transformation matrix Mc2 can be relatively easily generated (updated) in real time.

Figure 7:
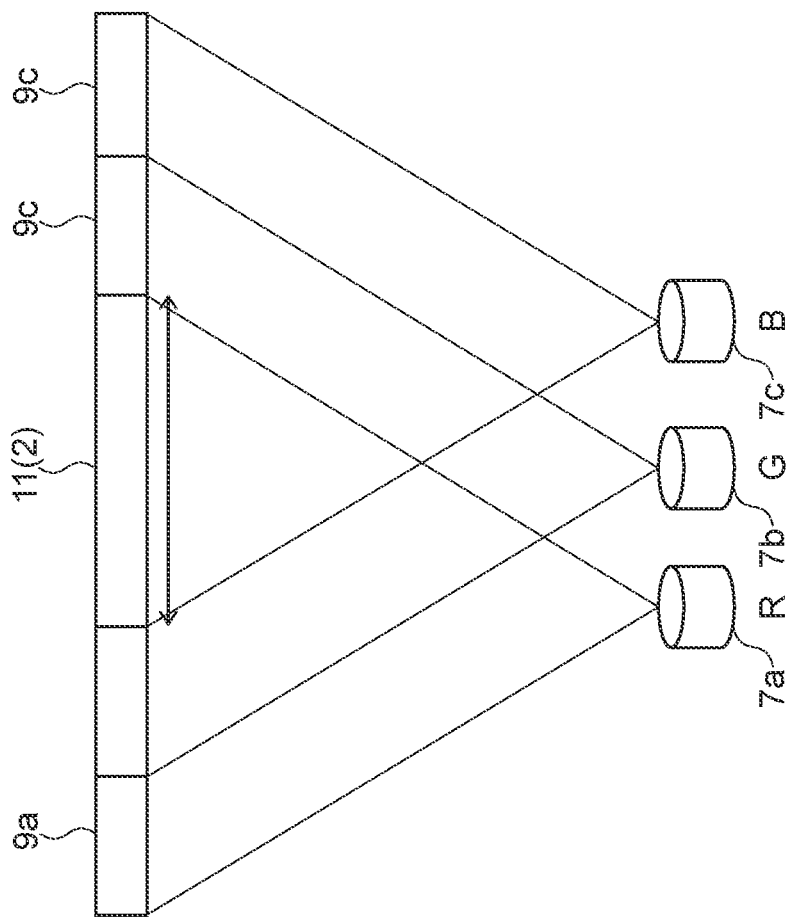
FIG. 7 is a schematic diagram used to describe a change in a projection distance between each of first to third monochromatic projectors and a projection plane.

Further, for example, when there is a change in a distance between each of the first to third monochromatic projectors 7a to 7c and a projection plane, a location of the projectable range 11 onto which the color image 2 can be projected is changed due to a parallax when the projection plane is viewed from the monochromatic projector 7, as illustrated in FIG. 7. Thus, the correction parameter 29 used to respond to a change in the location of the projectable range 11 is generated as the dynamic correction parameter.

For example, the transformation matrix Mc2 translating the input content image 12 is used as the correction parameter 29 used to correspond to a change in the location of the projectable range 11. The transformation matrix Mc2 can be relatively easily generated (updated) in real time.

Of course, the transformation matrix Mc2 performing both enlargement/reduction and translation with respect to the input content image 12 can also be generated. For example, an affine transformation matrix as indicated below can be used. Note that translation is performed by (t,u) in a formula and enlargement/reduction is performed by (s) in the formula.

$$\begin{pmatrix} X' \\ Y' \\ 1 \end{pmatrix} = \begin{pmatrix} s & 0 & t \\ 0 & s & u \\ 0 & 0 & 1 \end{pmatrix} \begin{pmatrix} X \\ Y \\ 1 \end{pmatrix} \quad \text{[Math. 3]}$$

Figure 8:
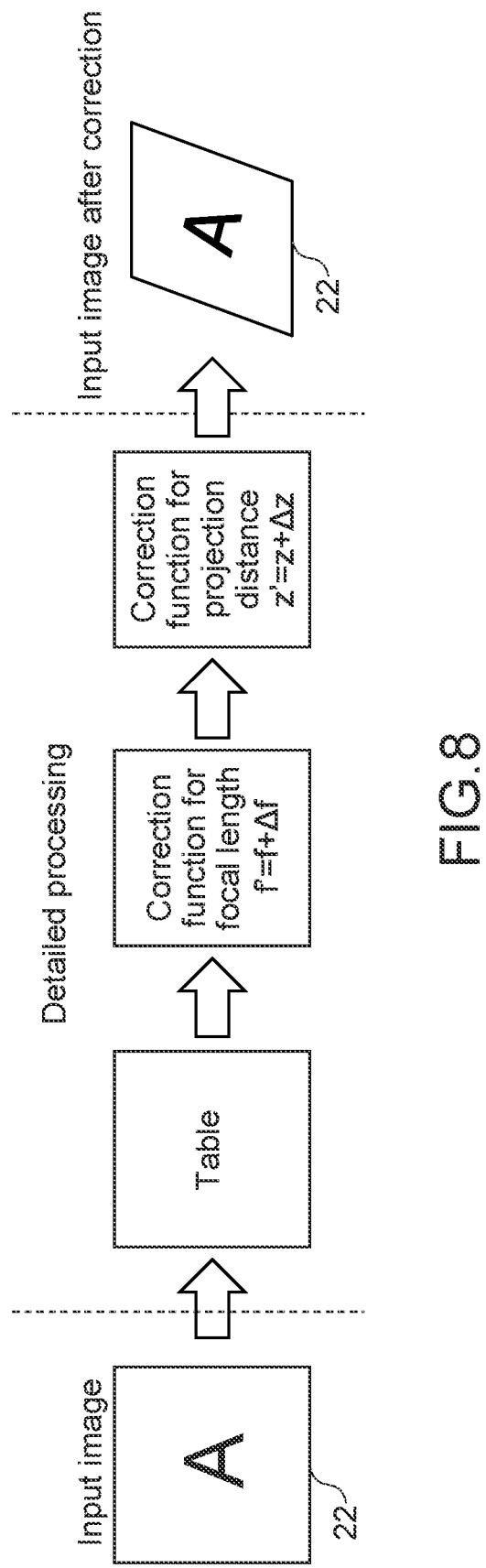
FIG. 8 schematically illustrates an example of correcting a content image using a shared correction parameter and a dynamic correction parameter.

FIG. 8 schematically illustrates an example of correcting the content image 22 using a shared correction parameter and a dynamic correction parameter.

In the example illustrated in FIG. 8, a correction parameter related to a relative positional relationship between the first to third monochromatic projectors 7a to 7c, and a correction parameter related to a lens distortion in each of the first to third monochromatic projectors 7a to 7c are used as shared correction parameters.

Shared correction parameters (such as the transformation matrix Mc1) correcting a component resulting from the relative positional relationship between the first to third monochromatic projectors 7a to 7c, and a component resulting from the lens distortion in each of the first to third monochromatic projectors 7a to 7c are stored in advance as table information.

For example, calibration is performed, for example, upon shipment from a factory (upon production and shipment) to generate a shared correction parameter (such as the transformation matrix Mc1). Of course, the configuration is not limited thereto.

Further, the table information is used for each frame, and the content image 22 is transformed.

Further, a correction parameter related to a focal length of each of the first to third monochromatic projectors 7a to 7c, and a correction parameter related to a distance (a projection distance) between each of the first to third monochromatic projectors 7a to 7c and a projection plane are used as dynamic correction parameters.

In the example illustrated in FIG. 8, dynamic correction parameters (such as the transformation matrix Mcg) used to correct a component resulting from a focal length f and a component resulting from a projection distance z are generated.

For example, calibration is performed, for example, upon shipment from a factory to calculate an initial value of a dynamic correction parameter. For example, initial values of components (t, u, s) of the affine transformation matrix in the formula of [Math. 3] is calculated. The calculated initial value is stored in the storage.

Upon starting the image projection system 100, calibration is performed in an environment in which the image projection apparatus 4 is used. This results in calculating Δf and Δz as differences from initial values of a dynamic correction parameter. Then, a focal length f' and a projection distance z' are calculated on the basis of their respective correction functions. The focal length f' and the projection distance z' are newly held as the focal length f and the projection distance z.

Upon projecting the content image 12, a change Δf in focal length f and a change Δz in projection distance z are presumed on the basis of a result of detection of the feature-point image 15. Then, the focal length f' after the change and the projection distance z' after the change are calculated on the basis of their respective correction functions.

A change in dynamic correction parameter is presumed on the basis of each of the calculated focal length f' and projection distance z', and the dynamic correction parameter is updated. For example, the components (t, u, s) of the affine transformation matrix in the formula of [Math. 3] are updated.

As illustrated in FIG. 8, two components that are a component resulting from the focal length f and a component resulting from the projection distance z are set to be targets to be corrected using dynamic correction parameters. In this case, when, for example, the affine transformation matrix in the formula of [Math. 3] is used, this makes it possible to reduce unknown parameters to three components (t, u, s), and thus in stabilizing processing of transforming the content image 22.

An example of an operation of the image projection system 100 is described with reference to FIGS. 9 to 12.

Figure 9:
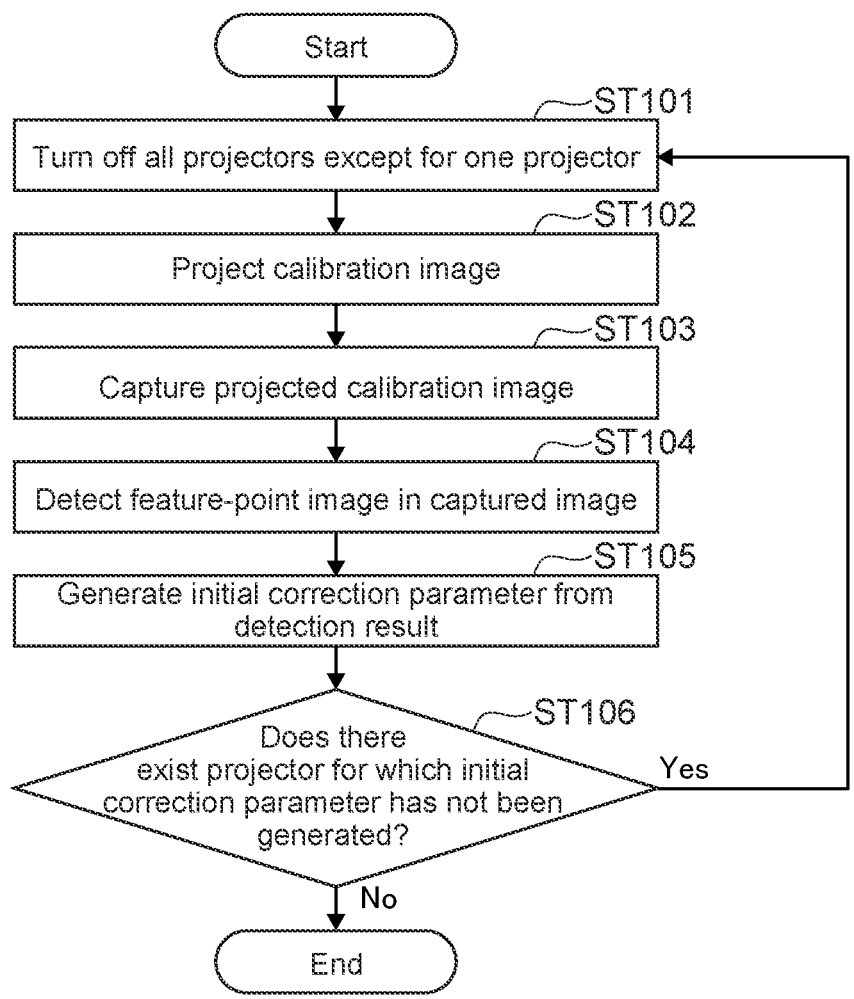
FIG. 9 is a flowchart illustrating an example of processing performed upon shipment from a factory.

FIG. 9 is a flowchart illustrating an example of processing performed upon shipment from a factory.

All of the first to third monochromatic projectors 7a to 7c are turned off except for one of the first to third monochromatic projectors 7a to 7c. In other words, only one of the first to third monochromatic projectors 7a to 7c is turned on (Step 101).

A calibration image 45 that is generated by the calibration image generator 35 is projected by the monochromatic projector 7 that has been turned on (Step 102).

Figure 13:
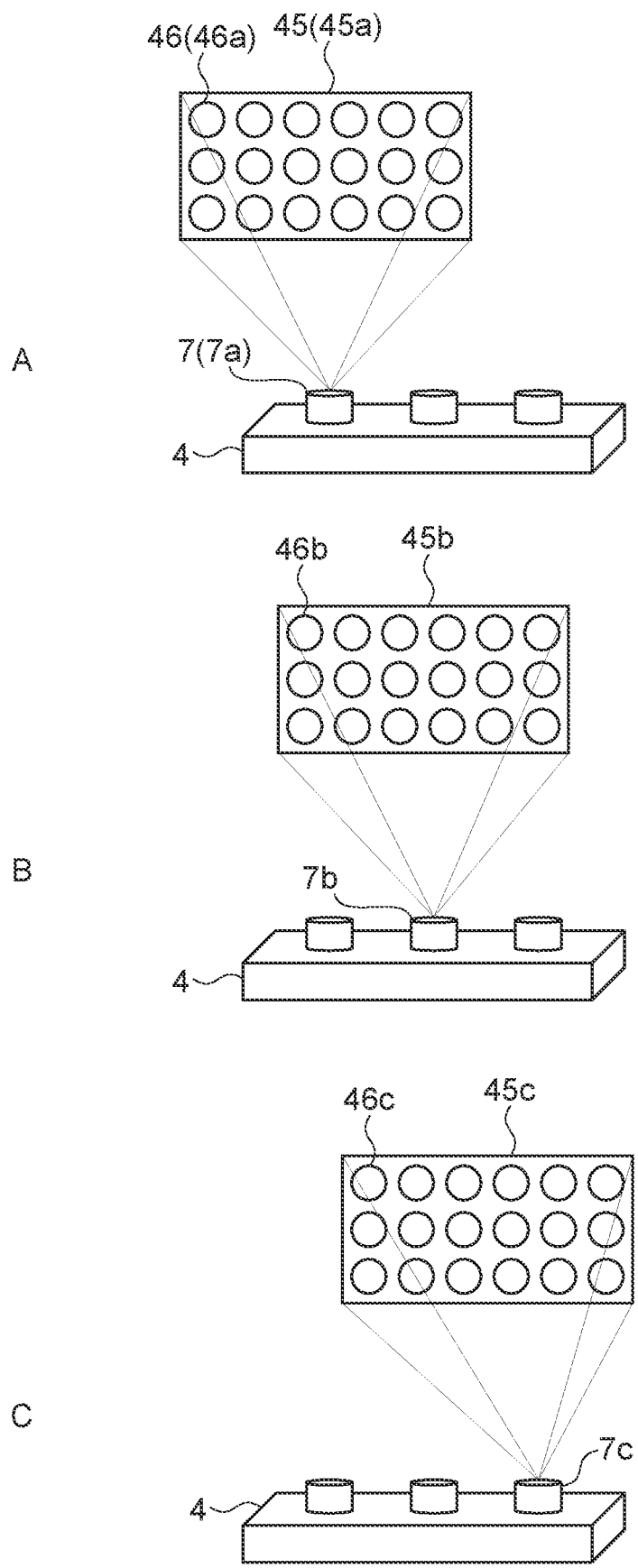
FIG. 13 schematically illustrates an example of projecting a calibration image.

FIG. 13 schematically illustrates an example of projecting a calibration image.

As illustrated in A to C of FIG. 13, calibration images 45a to 45c are respectively successively projected by the first to third monochromatic projectors 7a to 7c.

The calibration image 45 is an image of which the entirety of a pixel region is a target for forming a feature-point image. In other words, the calibration image 45 is an image in which a feature-point image 46 is arranged in the entirety of the image.

In the example illustrated in FIG. 13, a circular mark is projected as the feature-point image 46. Of course without being limited thereto, a shape and a size of the feature-point image 46, the number of feature-point images 46, a location of the feature-point image 46, and the like may be set discretionarily.

In Step 102, the calibration image 45 is projected with a known focal length and a known projection distance.

The image-capturing apparatus 5 captures the projected calibration image 45 (Step 103).

The feature point detector 36 detects the feature-point image 46 in the captured image (Step 104).

The correction parameter calculator 37 generates an initial correction parameter on the basis of a result of the detection of the feature-point image 46 (Step 105).

The initial correction parameter includes a shared correction parameter and an initial value of a dynamic correction parameter.

In the present embodiment, a correction parameter related to a relative positional relationship between the first to third monochromatic projectors 7a to 7c, and a correction parameter related to a lens distortion in each of the first to third monochromatic projectors 7a to 7c are generated as the shared correction parameters. Here, shared correction parameters for a known focal length and a known projection distance are generated.

Further, a correction parameter related to a focal length and a correction parameter related to a projection distance are generated as the dynamic correction parameters. A correction parameter corresponding to a known focal length and a correction parameter corresponding to a known projection distance are acquired as the initial values.

For example, a relative positional relationship between each of the first to third monochromatic projectors 7a to 7c and a projection plane is presumed on the basis of a result regarding the feature-point image 46. The shared correction parameters and the initial values of the dynamic correction parameters are generated on the basis of a result of the presumption.

The processes are repeated until the initial correction parameter is generated for each of the first to third monochromatic projectors 7a to 7c (Step 106). The initial correction parameter is stored in the storage.

Note that, in Step 105, information regarding a pixel region that corresponds to the projectable range 11 onto which the color image 2 is projected may be acquired for each monochromatic projector 7. Such information may be used as correction parameters when geometric transformation is performed on the content image 22.

Figure 10:
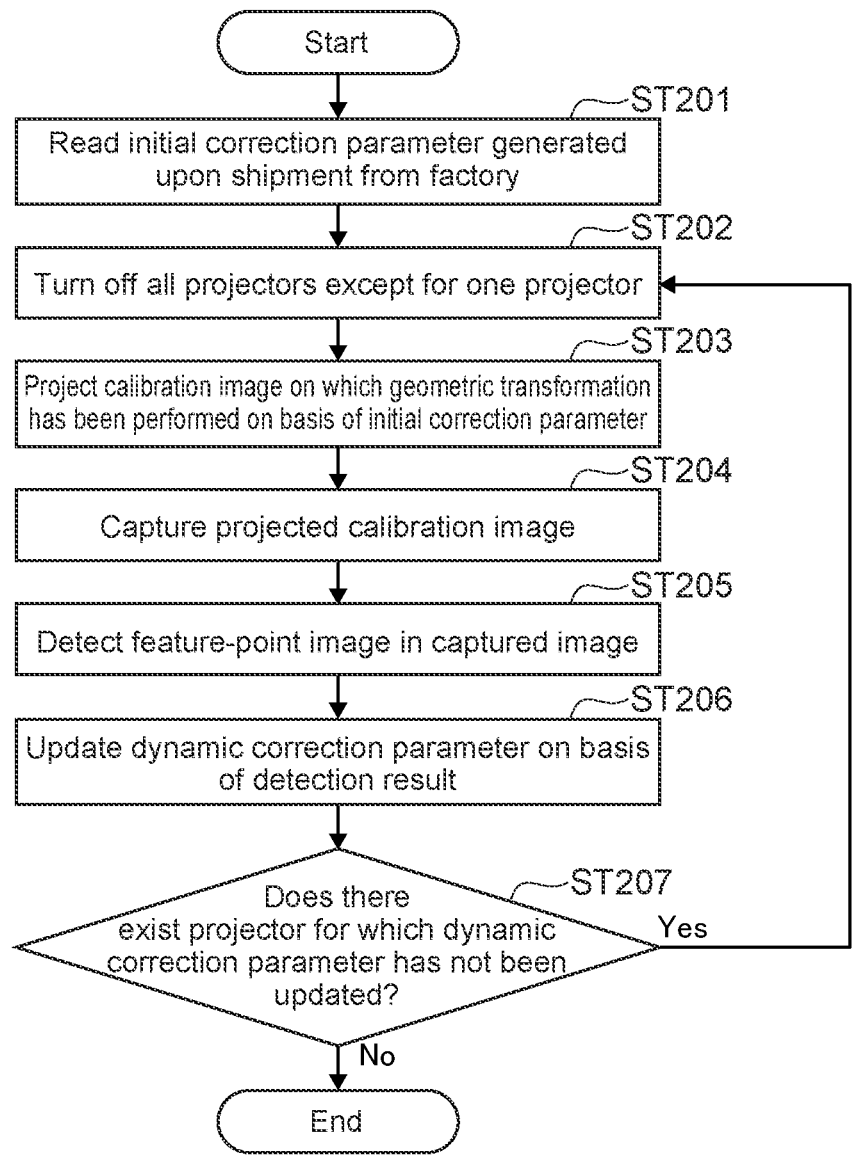
FIG. 10 is a flowchart illustrating an example of processing performed upon turning the power on (a successive turning-on flow).
Figure 11:
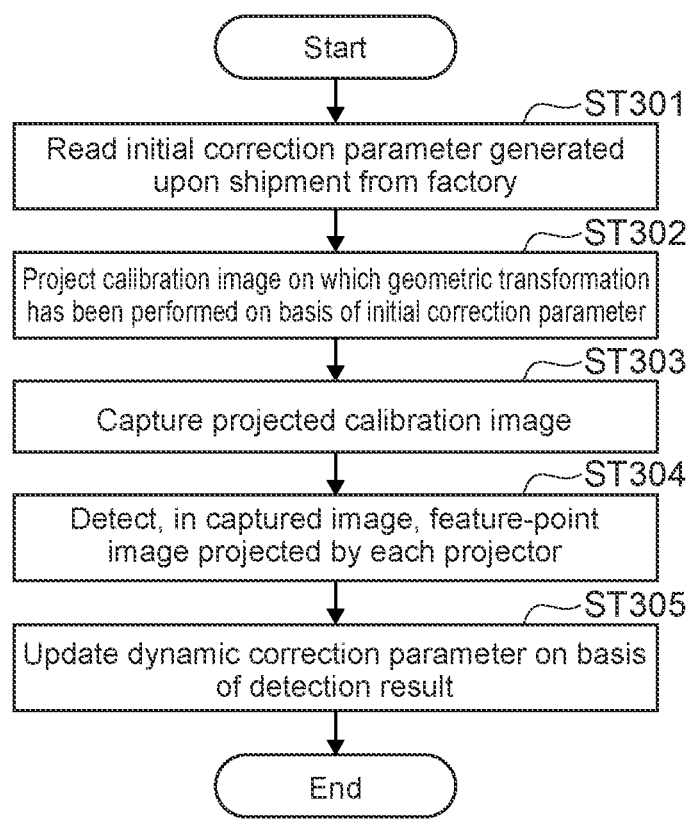
FIG. 11 is a flowchart illustrating an example of the processing performed upon turning the power on (a simultaneous turning-on flow).

FIGS. 10 and 11 are flowcharts illustrating examples of processing performed upon turning the power on when the image projection system 100 is started.

FIG. 10 is a flow performed when the first to third monochromatic projectors 7a to 7c are successively turned on.

FIG. 11 is a flow performed when the first to third monochromatic projectors 7a to 7c are simultaneously turned on.

One of the successive turning-on flow illustrated in FIG. 10 and the simultaneous turning-on flow illustrated in FIG. 11 can be selected.

In the course of turning the power on after shipment from a factory, the process moves on to a flow of calculating an amount of a change from an initial correction parameter in each environment upon starting. In the present embodiment, an amount of a change in a dynamic correction parameter is calculated, and the dynamic correction parameter is updated.

In the successive turning-on flow illustrated in FIG. 10, first, an initial correction parameter that is generated upon shipment from a factory is read (Step 201).

All of the first to third monochromatic projectors 7a to 7c are turned off except for one of the first to third monochromatic projectors 7a to 7c (Step 202).

The input image transformer 38 performs geometric transformation on the calibration image 45 on the basis of the initial correction parameter. The calibration image on which geometric transformation has been performed is projected by the monochromatic projector 7 that has been turned on (Step 203).

In the present embodiment, geometric transformation is performed on the calibration image 45 used upon shipment from a factory. Without being limited thereto, any other calibration image may be used.

The image-capturing apparatus 5 captures the projected calibration image 45 (Step 204).

The feature point detector 36 detects the feature-point image 46 in the captured image (Step 205).

The correction parameter calculator 37 updates a dynamic correction parameter on the basis of a result of the detection of the feature-point image 46. In other words, a difference from an initial value of the dynamic correction parameter that is included in the initial correction parameter is calculated, and the dynamic correction parameter is updated (Step 206).

The processes are repeated until the dynamic correction parameter is updated for each of the first to third monochromatic projectors 7a to 7c (Step 207). The updated dynamic correction parameter is stored in the storage.

In the simultaneous turning-on flow illustrated in FIG. 11, first, an initial correction parameter that is generated upon shipment from a factory is read (Step 301).

The input image transformer 38 performs geometric transformation on the calibration image 45 on the basis of the initial correction parameter. The calibration image on which geometric transformation has been performed is projected by each of the first to third monochromatic projectors 7a to 7c (Step 302).

The image-capturing apparatus 5 captures the projected calibration image 45 (Step 303).

The feature point detector 36 detects the feature-point image 46 in the captured image. Here, the feature-point image 46 projected by each of the first to third monochromatic projectors 7a to 7c is detected to be distinguishable. In other words, the feature-point image 46 is detected by determining by which of the monochromatic projectors 7 the feature-point image 46 has been projected (Step 304).

The correction parameter calculator 37 updates a dynamic correction parameter on the basis of a result of the detection of the feature-point image 46 (Step 305). In Step 305, the dynamic correction parameter is updated for each of the first to third monochromatic projectors 7a to 7c.

Figure 12:
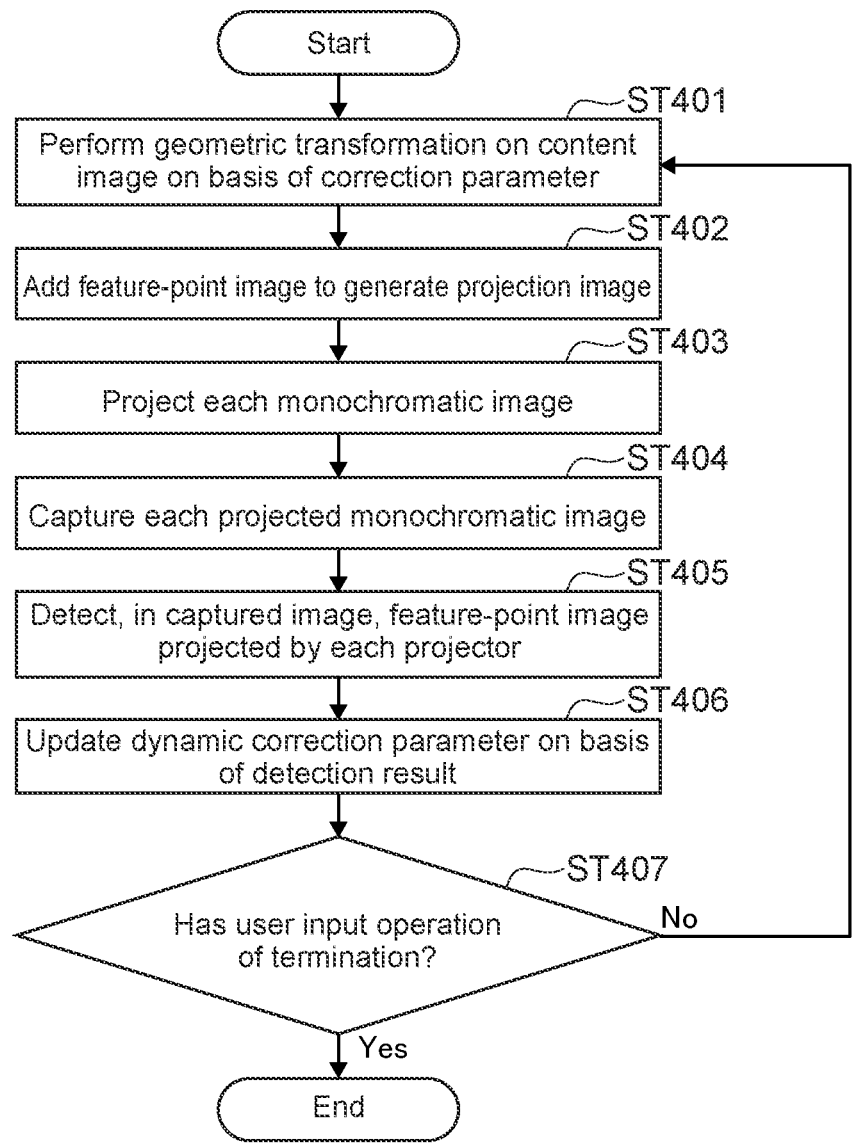
FIG. 12 is a flowchart illustrating an example of processing performed when a content image is projected.

FIG. 12 is a flowchart illustrating an example of processing performed when a content image is projected.

The input image transformer 38 performs geometric transformation on the content image 22 on the basis of a correction parameter (Step 401). The correction parameter includes a shared correction parameter and an updated dynamic correction parameter. Further, with respect to geometric transformation on the content image 22, the geometric transformation is performed on each of content images 22a to 22c of the three primary colors of R, G, and B.

The feature-point image setting section 39 sets the feature-point image 25.

A location (a coordinate location) of the feature-point image 25 embedded in the projection image 23 is changed according to, for example, a relationship between each monochromatic projector 7 and a projection plane.

The feature-point image setting section 39 can specify, for example, a location and a shape of the feature-point image 25 as appropriate according to a change in the geometric positional relationship. For example, by acquiring the correction parameter (the shared correction parameter and the updated dynamic correction parameter), the feature-point image setting section 39 can calculate a location and a shape of the feature-point image 25 that are optimal in a current frame.

For example, a location and the like of the feature-point image 25 that are calculated in a previous frame may be updated on the basis of the correction parameter.

The projection image generator 40 adds the feature-point image 25 to generate the projection image 23 (Step 402).

The monochromatic images 9a to 9c are projected on the basis of the generated projection images 23a to 23c (Step 403). As illustrated in FIG. 2, the color image 2 is projected onto the projectable range 11.

The image-capturing apparatus 5 captures the projected monochromatic images 9a to 9c (Step 404).

The feature point detector 36 detects the feature-point image 25 in the captured image. Here, the feature-point images 25a to 25c respectively projected by the first to third monochromatic projectors 7a to 7c are detected to be distinguishable (Step 405).

The correction parameter calculator 37 updates a dynamic correction parameter on the basis of a result of the detection of the feature-point image 25 (Step 406). For example, an amount of a change in the dynamic correction parameter is calculated on the basis of a result of the detection of the feature-point image 25, and the dynamic correction parameter is updated. In Step 406, the dynamic correction parameter is updated for each of the first to third monochromatic projectors 7a to 7c.

The processes are repeated until a user inputs an operation of termination (Step 407). Examples of the operation of termination include stopping playing back a content image.

As described above, in the present embodiment, a dynamic correction parameter is updated in real time for each frame, and geometric transformation is performed on the content image 22, and the feature-point image 25 is set.

Further, in the present embodiment, shared correction parameters used to correct a component related to a lens distortion and a component related to a relative position of each monochromatic projector 7 are acquired in advance upon shipment from a factory, the component related to a lens distortion and the component related to a relative position of each monochromatic projector 7 often causing a complicated correction. Further, dynamic correction parameters used to correct a component resulting from a focal length and a component resulting from a projection distance are updated in real time for each frame.

As described above, the classification of correction parameters into a shared correction parameter and a dynamic correction parameter makes it possible to reduce overall processing load due to the projection image 23 being generated for each frame. Consequently, correction processing is continuously performed in real time even if hardware that includes the image projection apparatus 4 is physically moved. This makes it possible to keep providing a blur-free color image 2 in a projection plane. In other words, the color image 2 can be projected stably.

Further, in the present embodiment, the dynamic correction parameter is updated on the basis of a captured image for each frame, and thus, a so-called feedback system is formed. This makes it possible to project the color image 2 stably even if the deformation of hardware or the drift in device characteristics is caused due to an external factor such as heat or an external force. This results in being able to obtain a higher-quality color image 2 on a projection plane.

As described, above, in the image projection system 100 according to the present embodiment, the projection image 23 including the first pixel region 26 including the content image 22, and the second pixel region 27 including the feature-point image 25 in at least a portion of the second pixel region 27, is generated. The projection images 23 are projected by a plurality of monochromatic projectors 7. The feature-point image 15 is detected in a captured image obtained by capturing the projected monochromatic image 9, and the correction parameter 29 used to generate a projection image is generated on the basis of a result of the detection. This makes it possible to project a high-quality image using a plurality of monochromatic projectors 7.

In recent years, projectors have been made smaller in size, and this enables projectors to be included in mobile apparatuses. Making projectors smaller in size is an important factor for including a projector in a mobile apparatus, since this results in making the entirety of the apparatus smaller in size and shorter in height.

Existing color projectors have been continuously made smaller in size. However, it may be difficult for existing color projectors to have a certain size or a size smaller than the certain size under design constraints due to their complicated optical systems. Thus, three or more small monochromatic projectors in total that each include simple optics are included at least for the three primary colors, as presented in the present embodiment, and this makes it possible to further make a projector functional section physically smaller in size and shorter in height.

In this case, images respectively projected by monochromatic projectors of respective colors are combined in an overlap region in a projection plane onto which the respective monochromatic projectors can perform projection. This makes it possible to perform rendering to generate a higher-quality color image 2.

On the other hand, when such a system is used for a mobile apparatus, a geometric relationship between a projection plane and each of the plurality of monochromatic projectors 7 may be changed every moment. Thus, there is a need to calculate the geometric relationship in real time, in order to keep projecting a high-quality color image 2 stably.

For example, in the case of the projection system disclosed in Patent Literature 1 described above, there is a concern in terms of power consumption, such as an increase in the number of necessary additional apparatuses such as infrared cameras or infrared projectors. Further, a selected ranging approach may constrain limits in accuracy, and this may result in not obtaining a sufficiently high-quality combining image.

Examples of a method for acquiring a geometric positional relationship with a projection plane include a ranging approach using, for example, a time-of-flight (ToF) approach. There is still a need for an additional apparatus such as a ToF apparatus when such an approach is used. This results in an increase in power consumption. Further, a ranging approach using, for example, a ToF approach is a low-resolution approach in general. Thus, a correction parameter obtained by the ranging approach results in limits in accuracy. This may result in a degradation in image quality due to, for example, a false color being provided to an edge of a color image in a projection plane.

The application of the present technology results in projecting the feature-point image 15 onto a region onto which the content image 12 is not projected. Further, this makes it possible to update a correction parameter for each frame on the basis of a result of capturing a projected image.

This results in there being a need for fewer additional apparatuses, and thus in being advantageous in terms of power consumption. Further, a feedback system can be formed, and this makes it possible to correct the content image 22 with a high degree of accuracy.

Further, an upper limit of a degree of accuracy with which correction can be performed is defined by, for example, the resolution of the image-capturing apparatus 5 and the resolution of a plurality of monochromatic projectors 7, and it is not difficult to select high-resolution devices as the image-capturing apparatus 5 and the plurality of monochromatic projectors 7. Thus, high-quality hardware can be easily prepared, and a degree of accuracy with which correction can be performed, can be increased.

The type of electronic apparatus that can include the image projection system 100 according to the present technology is not limited. For example, the present technology can be applied to any electronic apparatuses such as electronic apparatuses including cellular phones, smartphones, personal computers, game devices, digital cameras, audio apparatuses, TVs, projectors, car navigation systems, GPS terminals, and (glasses-type or wristband-type) wearable information apparatuses; and IoT apparatuses connected to, for example, the Internet.

OTHER EMBODIMENTS

The present technology is not limited to the embodiments described above, and can achieve various other embodiments.

Figure 14:
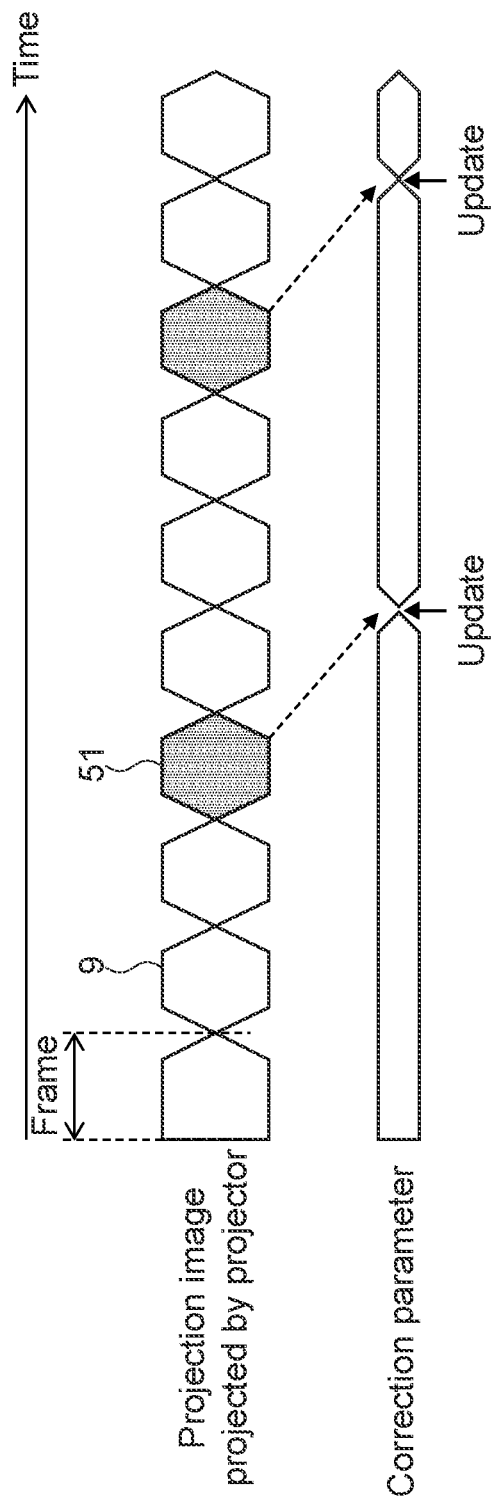
FIG. 14 is a schematic diagram used to describe another example of image projection performed by the image projection system.

FIG. 14 is a schematic diagram used to describe another example of image projection performed by the image projection system 100.

For example, the first generator 18 may generate a calibration image as a correction image that is projected in a specified frame, the calibration image being an image of which the entirety of a pixel region is a target for setting a feature-point image.

As illustrated in FIG. 14, a calibration image 51 is projected as a correction image in a specified frame.

For example, the calibration image 45 as illustrated in FIG. 13 is inserted to be projected infrequently, such as every few frames to every tens of frames.

For example, the calibration images 51 of the three primary colors of R, G, and B may be projected at the same time. Alternatively, the calibration images 51 of the three primary colors of R, G, and B may be projected one by one in turn. Further, the color of a projection-target calibration image 51 may be selectable by a user.

The second correction section 19 updates a correction parameter on the basis of a captured image obtained by the calibration image 51 being captured by each of the plurality of monochromatic projectors 7.

For example, both a shared correction parameter and a dynamic correction parameter may be updated, as in the case of calibration performed upon shipment from a factory. Of course, only a dynamic correction parameter may be updated.

Calibration is performed on the way using the calibration image 51, and this makes it possible to directly calculate a correction parameter in the entirety of a region including the projectable range 11 onto which the color image 2 is projected. Consequently, for example, even if errors are accumulated by generating a correction parameter on the basis of the feature-point image 15 projected onto a non-content-projection region (the second projection region 14), the accumulated errors can be canceled.

This makes it possible to acquire a correction parameter having a higher degree of accuracy.

When the present technology is applied, the number of a plurality of monochromatic projectors 7 and a combination of single colors are not limited, and can be set discretionarily.

The configuration in which a single apparatus such as the mobile terminal 1 includes the image projection system 100 according to the present technology, has been described above. Without being limited thereto, the image processing apparatus according to the present technology may be implemented by any computer such as a PC separately from the image-capturing apparatus 5 and the image projection apparatus 4.

Figure 15:
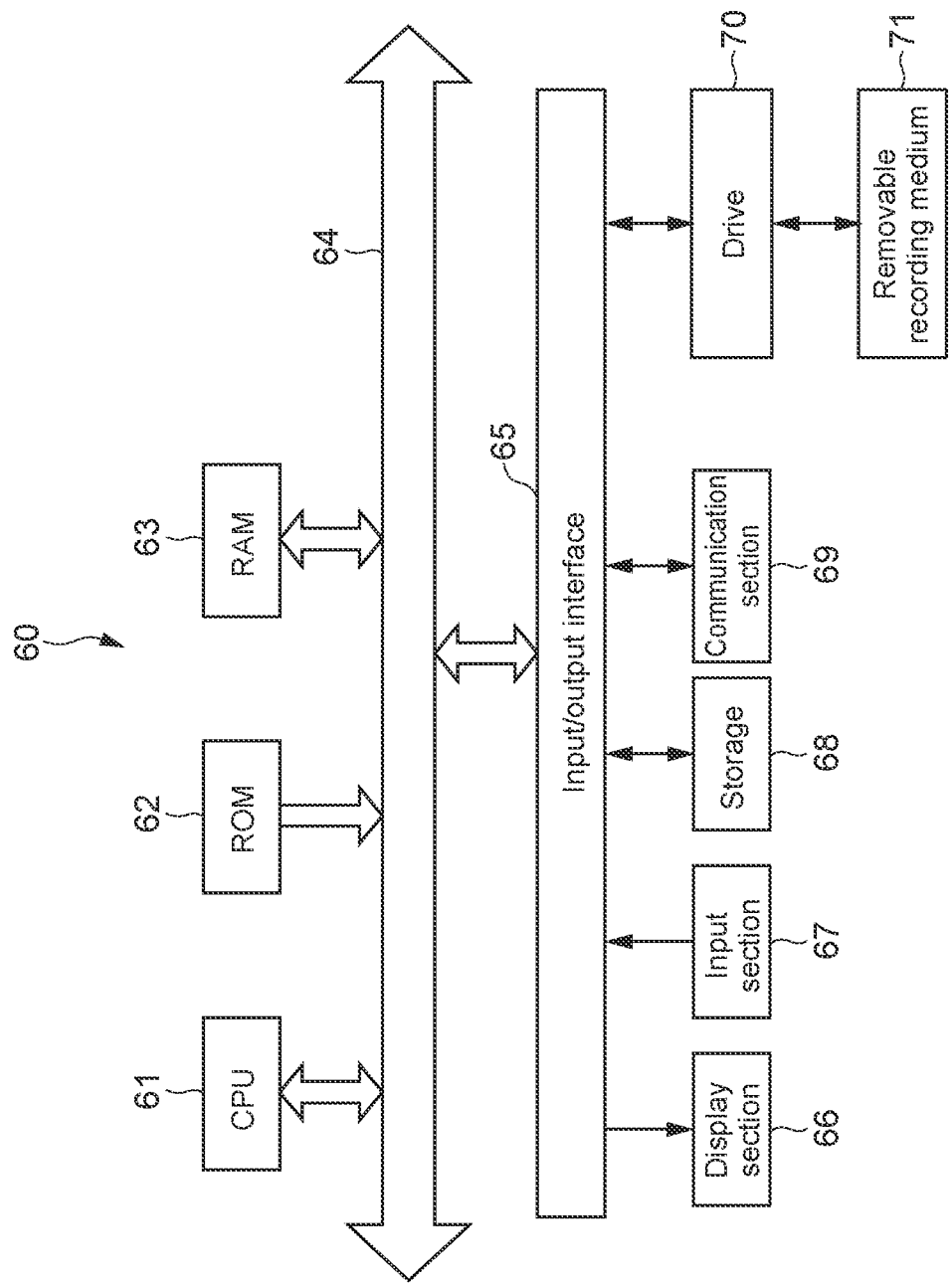
FIG. 15 is a block diagram illustrating an example of a hardware configuration of a computer.

FIG. 15 is a block diagram illustrating an example of a hardware configuration of a computer 60 by which the information processing apparatus can be implemented.

The computer 60 includes a CPU 61, a read only memory (ROM) 62, a RAM 63, an input/output interface 65, and a bus 64 through which these components are connected to each other. A display section 66, an input section 67, a storage 68, a communication section 69, a drive 70, and the like are connected to the input/output interface 65.

The display section 66 is a display device using, for example, liquid crystal or EL. Examples of the input section 67 include a keyboard, a pointing device, a touch panel, and other operation apparatuses. When the input section 67 includes a touch panel, the touch panel may be integrated with the display section 66.

The storage 68 is a nonvolatile storage device, and examples of the storage 68 include an HDD, a flash memory, and other solid-state memories. The drive 70 is a device that can drive a removable recording medium 71 such as an optical recording medium or a magnetic recording tape.

The communication section 69 is a modem, a router, or another communication apparatus that can be connected to, for example, a LAN or a WAN and is used to communicate with another device. The communication section 69 may perform communication wirelessly or by wire. The communication section 69 is often used in a state of being separate from the computer 60.

Information processing performed by the computer 60 having the hardware configuration described above is performed by software stored in, for example, the storage 68 or the ROM 62, and hardware resources of the computer 60 working cooperatively. Specifically, the information processing method according to the present technology is performed by loading, into the RAM 63, a program included in the software and stored in the ROM 62 or the like and executing the program.

For example, the program is installed on the computer 60 through the recording medium 61. Alternatively, the program may be installed on the computer 60 through, for example, a global network. Moreover, any non-transitory computer-readable storage medium may be used.

The image processing method and the program according to the present technology may be executed and the image processing apparatus according to the present technology may be implemented by a plurality of computers communicatively connected to each other working cooperatively through, for example, a network.

In other words, the information processing method and the program according to the present technology can be executed not only in a computer system that includes a single computer, but also in a computer system in which a plurality of computers operates cooperatively.

Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the image processing method and the program according to the present technology by the computer system includes, for example, both the case in which the acquisition of a content image, the generation of a projection image, the detection of a feature-point image, the generation of a correction parameter, and the like are executed by a single computer; and the case in which the respective processes are executed by different computers. Further, the execution of the respective processes by a specified computer includes causing another computer to execute a portion of or all of the processes and acquiring a result of it.

In other words, the image processing method and the program according to the present technology are also applicable to a configuration of cloud computing in which a single function is shared and cooperatively processed by a plurality of apparatuses through a network.

The respective configurations of the image projection system, the image-capturing apparatus, the image projection apparatus, the monochromatic projector, the image processing apparatus, the projection image, and the calibration image; the respective processing flows; and the like described with reference to the respective figures are merely embodiments, and any modifications may be made thereto without departing from the spirit of the present technology. In other words, for example, any other configurations or algorithms for purpose of practicing the present technology may be adopted.

When wording such as "substantially" or "about" is used in the present disclosure, such wording is merely used to facilitate the understanding of the description, and whether the wording such as "substantially" or "about" is used has no particular significance.

In other words, in the present disclosure, expressions, such as "center", "middle", "uniform", "equal", "same", "orthogonal", "parallel", "symmetric", "extend", "axial direction", "columnar", "cylindrical", "ring-shaped", and "annular" that define, for example, a shape, a size, a positional relationship, and a state respectively include, in concept, expressions such as "substantially the center/substantial center", "substantially the middle/substantially middle", "substantially uniform", "substantially equal", "substantially the same", "substantially orthogonal", "substantially parallel", "substantially symmetric", "substantially extend", "substantially axial direction", "substantially columnar", "substantially cylindrical", "substantially ring-shaped", and "substantially annular".

For example, the expressions such as "center", "middle", "uniform", "equal", "same", "orthogonal", "parallel", "symmetric", "extend", "axial direction", "columnar", "cylindrical", "ring-shaped", and "annular" also respectively include states within specified ranges (such as a range of +/−10%), with expressions such as "exactly the center/exact center", "exactly the middle/exactly middle", "exactly uniform", "exactly equal", "exactly the same", "completely orthogonal", "completely parallel", "completely symmetric", "completely extend", "fully axial direction", "perfectly columnar", "perfectly cylindrical", "perfectly ring-shaped", and "perfectly annular" being respectively used as references.

Thus, an expression that does not include the wording such as "substantially" or "about" can also include, in concept, an expression including the wording such as "substantially" or "about". Conversely, a state expressed using the expression including the wording such as "substantially" or "about" may include a state of "exactly/exact", "completely", "fully", or "perfectly".

In the present disclosure, an expression using "-er than" such as "being larger than A" and "being smaller than A" comprehensively includes, in concept, an expression that includes "being equal to A" and an expression that does not include "being equal to A". For example, "being larger than A" is not limited to the expression that does not include "being equal to A", and also includes "being equal to or greater than A". Further, "being smaller than A" is not limited to "being less than A", and also includes "being equal to or less than A".

When the present technology is carried out, it is sufficient if a specific setting or the like may be adopted as appropriate from expressions included in "being larger than A" and expressions included in "being smaller than A", in order to provide the effects described above.

At least two of the features of the present technology described above can also be combined. In other words, the various features described in the respective embodiments may be combined discretionarily regardless of the embodiments. Further, the various effects described above are not limitative but are merely illustrative, and other effects may be provided.

Note that the present technology may also take the following configurations.

(1) An image processing apparatus, including:
 a first generator that generates projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region; and
 a second generator that detects the feature-point image in a captured image obtained by capturing the projection image projected by each of the plurality of monochromatic projectors, and generates the correction parameter on the basis of a result of the detection of the feature-point image.

(2) The image processing apparatus according to (1), in which
 the first generator generates a plurality of the projection images such that the content images overlap each other when the plurality of the projection images is projected by the plurality of monochromatic projectors.

(3) The image processing apparatus according to (1) or (2), further including
 an acquisition section that acquires the content image, which is to be projected by each of the plurality of monochromatic projectors, in which
 the first generator
 corrects the acquired content image using the correction parameter, and
 generates the projection image.

(4) The image processing apparatus according to any one of (1) to (3), in which
 the first generator generates the projection image at a specified frame rate, and
 the second generator generates the correction parameter for each frame.

(5) The image processing apparatus according to (4), in which
 the second generator updates the correction parameter generated in a previous frame, on the basis of the result of the detection of the feature-point image.

(6) The image processing apparatus according to (5), in which
 the second generator
 presumes a change in the correction parameter on the basis of the result of the detection of the feature-point image, and
 updates the correction parameter.

(7) The image processing apparatus according any one of (1) to (6), in which
 the second generator
 determines by which of the plurality of monochromatic projectors the feature-point image has been projected, and
 generates the correction parameter correspondingly to each of the plurality of monochromatic projectors on the basis of the result of the detection of the feature-point image corresponding to the monochromatic projector of the plurality of monochromatic projectors.

(8) The image processing apparatus according to any one of (1) to (7), in which
 the second generator generates, as a dynamic correction parameter, at least one of the correction parameter related to a focal length of each of the plurality of monochromatic projectors, or the correction parameter related to a positional relationship between each of the plurality of monochromatic projectors and a projection plane, and
 the first generator generates the projection image using the generated dynamic correction parameter.

(9) The image processing apparatus according to (8), further including
 a storage that stores therein, as a shared correction parameter, at least one of the correction parameter related to a relative positional relationship between the monochromatic projectors of the plurality of monochromatic projectors, or the correction parameter related to a lens distortion in each of the plurality of monochromatic projectors, in which
 the first generator generates the projection image using the stored shared correction parameter.

(10) The image processing apparatus according to any one of (1) to (9), in which
 the first generator calculates a location of the feature-point image in the second pixel region on the basis of the generated correction parameter.

(11) The image processing apparatus according to any one of (1) to (10), in which
 the first generator generates, as a correction image, an image of which the entirety of a pixel region is a target for setting a feature-point image, the correction image being projected in a specified frame, and
 the second generator updates the correction parameter on the basis of a captured image obtained by capturing the correction image projected by each of the plurality of monochromatic projectors.

(12) The image processing apparatus according to any one of (1) to (11), in which
the plurality of monochromatic projectors is a first monochromatic projector, a second monochromatic projector, and a third monochromatic projector, the first monochromatic projector projecting a red image made up of red light, the second monochromatic projector projecting a green image made up of green light, the third monochromatic projector projecting a blue image made up of blue light, and
a color image is displayed by the content images overlapping each other when the plurality of the projection images is projected by the plurality of monochromatic projectors.

(13) An image processing method that is performed by a computer system, the image processing method including:
generating projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region;
detecting the feature-point image in a captured image obtained by capturing the projection image projected by each of the plurality of monochromatic projectors; and
generating the correction parameter on the basis of a result of the detection of the feature-point image.

(14) A program that causes a computer system to perform a process including:
generating projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region;
detecting the feature-point image in a captured image obtained by capturing the projection image projected by each of the plurality of monochromatic projectors; and
generating the correction parameter on the basis of a result of the detection of the feature-point image.

REFERENCE SIGNS LIST 1 mobile terminal
2 color image
4 image projection apparatus
5 image-capturing apparatus
6 image processing section
7 monochromatic projector
9 monochromatic image
10 projection range
11 projectable range (overlap range)
12 content image
13 first projection region
14 second projection region
15 feature-point image
22 content image (image data)
23 projection image (image data)
52 feature-point image (image data)
26 first pixel region
27 second pixel region
29 correction parameter
45, 51 calibration image
46 feature-point image
100 image processing system

The invention claimed is:

1. An image processing apparatus, comprising:
a first generator that generates projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region; and
a second generator that detects the feature-point image in a captured image obtained by capturing the projection image projected by each of the plurality of monochromatic projectors, and generates the correction parameter on a basis of a result of the detection of the feature-point image.

2. The image processing apparatus according to claim 1, wherein
the first generator generates a plurality of the projection images such that the content images overlap each other when the plurality of the projection images is projected by the plurality of monochromatic projectors.

3. The image processing apparatus according to claim 1, further comprising
an acquisition section that acquires the content image, which is to be projected by each of the plurality of monochromatic projectors, wherein
the first generator
corrects the acquired content image using the correction parameter, and
generates the projection image.

4. The image processing apparatus according to claim 1, wherein
the first generator generates the projection image at a specified frame rate, and
the second generator generates the correction parameter for each frame.

5. The image processing apparatus according to claim 4, wherein
the second generator updates the correction parameter generated in a previous frame, on the basis of the result of the detection of the feature-point image.

6. The image processing apparatus according to claim 5, wherein
the second generator
presumes a change in the correction parameter on the basis of the result of the detection of the feature-point image, and
updates the correction parameter.

7. The image processing apparatus according to claim 1, wherein
the second generator
determines by which of the plurality of monochromatic projectors the feature-point image has been projected, and
generates the correction parameter correspondingly to each of the plurality of monochromatic projectors on the basis of the result of the detection of the feature-point image corresponding to the monochromatic projector of the plurality of monochromatic projectors.

8. The image processing apparatus according to claim 1, wherein
the second generator generates, as a dynamic correction parameter, at least one of the correction parameter related to a focal length of each of the plurality of monochromatic projectors, or the correction parameter related to a positional relationship between each of the plurality of monochromatic projectors and a projection plane, and the first generator generates the projection image using the generated dynamic correction parameter.

9. The image processing apparatus according to claim 8, further comprising a storage that stores therein, as a shared correction parameter, at least one of the correction parameter related to a relative positional relationship between the monochromatic projectors of the plurality of monochromatic projectors, or the correction parameter related to a lens distortion in each of the plurality of monochromatic projectors, wherein the first generator generates the projection image using the stored shared correction parameter.

10. The image processing apparatus according to claim 1, wherein the first generator calculates a location of the feature-point image in the second pixel region on a basis of the generated correction parameter.

11. The image processing apparatus according to claim 1, wherein the first generator generates, as a correction image, an image of which the entirety of a pixel region is a target for setting a feature-point image, the correction image being projected in a specified frame, and the second generator updates the correction parameter on a basis of a captured image obtained by capturing the correction image projected by each of the plurality of monochromatic projectors.

12. The image processing apparatus according to claim 1, wherein the plurality of monochromatic projectors is a first monochromatic projector, a second monochromatic projector, and a third monochromatic projector, the first monochromatic projector projecting a red image made up of red light, the second monochromatic projector projecting a green image made up of green light, the third monochromatic projector projecting a blue image made up of blue light, and a color image is displayed by the content images overlapping each other when the plurality of the projection images is projected by the plurality of monochromatic projectors.

13. An image processing method that is performed by a computer system, the image processing method comprising:

generating projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region;

detecting the feature-point image in a captured image obtained by capturing the projection image projected by each of the plurality of monochromatic projectors; and generating the correction parameter on a basis of a result of the detection of the feature-point image.

14. A non-transitory computer-readable medium having embodied thereon a program, which when executed by a computer causes the computer to execute a method, the method comprising:

generating projection images correspondingly to respective monochromatic projectors of a plurality of monochromatic projectors using respective correction parameters, each projection image including a first pixel region that includes a content image, and a second pixel region that is a region other than the first pixel region, the second pixel region including a feature-point image in at least a portion of the second pixel region;

detecting the feature-point image in a captured image obtained by capturing the projection image projected by each of the plurality of monochromatic projectors; and generating the correction parameter on a basis of a result of the detection of the feature-point image.

* * * * *